United States Patent
Kurokawa

(10) Patent No.: US 11,136,058 B2
(45) Date of Patent: Oct. 5, 2021

(54) OUTER COLUMN AND STEERING APPARATUS

(71) Applicant: NSK LTD., Tokyo (JP)

(72) Inventor: Yoshifumi Kurokawa, Maebashi (JP)

(73) Assignee: NSK, Ltd., Tokyo (JP)

( * ) Notice: Subject to any disclaimer, the term of this patent is extended or adjusted under 35 U.S.C. 154(b) by 22 days.

(21) Appl. No.: 16/609,853

(22) PCT Filed: Jun. 8, 2018

(86) PCT No.: PCT/JP2018/021987
§ 371 (c)(1),
(2) Date: Oct. 31, 2019

(87) PCT Pub. No.: WO2018/230455
PCT Pub. Date: Dec. 20, 2018

(65) Prior Publication Data
US 2020/0094866 A1    Mar. 26, 2020

(30) Foreign Application Priority Data
Jun. 14, 2017    (JP) .............................. JP2017-116427

(51) Int. Cl.
*B62D 1/184*    (2006.01)
*B62D 1/185*    (2006.01)
(Continued)

(52) U.S. Cl.
CPC ............. *B62D 1/184* (2013.01); *B62D 1/185* (2013.01); *B60R 16/027* (2013.01); *B62D 1/189* (2013.01); *B62D 1/192* (2013.01); *B62D 1/195* (2013.01)

(58) Field of Classification Search
CPC ........ B62D 1/184; B62D 1/185; B62D 1/183; B62D 1/189; B62D 1/192; B62D 1/18; B62D 1/19; B62D 1/187; B62D 1/16
(Continued)

(56) References Cited

U.S. PATENT DOCUMENTS

2006/0028010 A1* 2/2006 Yamada ................. B62D 1/184
280/775
2012/0248752 A1   10/2012 Maniwa et al.
(Continued)

FOREIGN PATENT DOCUMENTS

| CN | 102700599 A | 10/2012 |
| CN | 102958779 A | 3/2013 |

(Continued)

OTHER PUBLICATIONS

International Search Report for International Application No. PCT/JP2018/021987, dated Jul. 10, 2018, (2 pages).
(Continued)

*Primary Examiner* — Keith J Frisby
(74) *Attorney, Agent, or Firm* — Hartman Global IP Law; Gary M. Hartman; Domenica N. S. Hartman

(57) ABSTRACT

A steering apparatus having inner and outer columns. The outer column includes a pair of side plate sections respectively extending in the axial direction, located on both sides in the width direction of the inner column, and has a column-side through hole that passes through in the width direction on one side of the inner column with respect to the height direction in a part in the axial direction thereof, and a column pressing section provided in at least one of the pair of plate sections and able to press the inner column in a direction away from the column-side through holes with respect to the height direction when displaced inward in the width direction, and a widening section in at least one of the
(Continued)

pair of plate sections and pressed outward in the width direction via the inner column that is pressed by the column pressing sections.

21 Claims, 13 Drawing Sheets

(51) Int. Cl.
   *B62D 1/189* (2006.01)
   *B60R 16/027* (2006.01)
   *B62D 1/19* (2006.01)

(58) Field of Classification Search
   USPC .......................................... 74/493; 280/775
   See application file for complete search history.

(56) References Cited

U.S. PATENT DOCUMENTS

2013/0160595 A1    6/2013   Moriyama et al.
2015/0375770 A1*  12/2015   Buzzard ................ B62D 1/184
                                                                74/493

FOREIGN PATENT DOCUMENTS

| DE | 102015000028 A1 | 7/2016 | |
| EP | 1364856 | 11/2003 | |
| EP | E P-1529714 A2 * | 5/2005 | ............. B62D 1/187 |
| JP | 61-57076 | 4/1986 | |
| JP | 2001347953 | 12/2001 | |
| JP | 2002053048 A | 2/2002 | |
| JP | 2006306263 | 11/2006 | |
| JP | 2009001050 | 1/2009 | |
| JP | 2012030784 | 2/2012 | |
| JP | 2014104786 | 6/2014 | |
| JP | 2015189259 A | 11/2015 | |
| WO | 2003047944 | 6/2003 | |
| WO | 2006118054 | 11/2006 | |
| WO | 2016-110335 | 7/2016 | |

OTHER PUBLICATIONS

1st Office Action—Chinese Application No. 201880027356.0, Dated Jun. 22, 2021 (English & Translation), 22 pages.

* cited by examiner

PRIOR ART

OUTER COLUMN AND STEERING APPARATUS

CROSS REFERENCE TO RELATED APPLICATIONS

This application claims the benefit of PCT/JP2018/021987, filed Jun. 8, 2018, having a priority claim to JP Patent Application No. 2017-116427, filed Jun. 14, 2017. The contents of these prior patent documents are incorporated herein by reference.

TECHNICAL FIELD

The present invention relates to a steering apparatus for imparting a steering angle to a steering wheel of a vehicle, and more particularly relates to a steering column that is assembled in this steering apparatus.

BACKGROUND ART

FIG. 12 illustrates an example of a conventional steering apparatus for an automobile as disclosed in JP2014-104786 (A). The steering apparatus of this example comprises a steering wheel 1, a steering shaft 2, a steering column 3, a pair of universal joints 4, 5, an intermediate shaft 6, a steering gear unit 7, and a pair of tie rods 8.

The steering wheel 1 is attached to the rear-end section of the steering shaft 2 that is rotatably supported inside the steering column 3. The front-end section of the steering shaft 2 is connected to an input shaft 9 of the steering gear unit 7 via the pair of universal joints 4, 5 and the intermediate shaft 6. By transforming the rotation of the input shaft 9 into a linear motion of a rack that is not shown, the pair of tie rods 8 are pushed or pulled so as to be able to apply a steering angle to the steered wheels according to the amount that the steering wheel 1 is operated. In the illustrated example, an electric assist device, which decreases the force required to operate the steering wheel 1, is assembled in the steering apparatus with an electric motor 10 as a subsidized power source. Unless otherwise indicated herein, the forward-backward direction, the width direction, and the up-down direction of the outer column and the steering apparatus means the forward-backward direction, the width direction, and the up-down direction of the vehicle body in a state where the outer column and the steering apparatus are assembled to the vehicle body.

The steering apparatus illustrated in FIG. 12 comprises a tilt mechanism for adjusting the up/down position of the steering wheel 1 and a telescopic mechanism for adjusting the forward/backward position of the steering wheel 1, in accordance with the size and operating posture of the operator. The tilt mechanism is constructed by supporting the steering column 3 with respect to the steering column 3 so as to be able to pivotally displace around a pivot shaft 12 that is provided in the width direction. The telescopic mechanism is constructed by combining an outer column 13 on the rear side and an inner column 14 on the front side so as to be able to be extended or contracted to form the steering column 3, and by combining an outer shaft 15 on the rear side and an inner shaft 16 on the front side by a spline joint and the like so as to be able to transmit torque and be extended or contracted to form the steering shaft 2. In this construction, the rear side section of the outer column 13 is supported by a support bracket 17 that is supported and fixed to the vehicle body 11 so as to be able to displace in the up-down direction and the forward-backward direction.

The steering apparatus that enables position adjustment of the steering wheel comprises a clamp mechanism for switching between status where position adjustment of the steering wheel is possible and status where the position of the steering wheel after adjustment is able to be maintained. FIG. 13 illustrates an example of a clamp mechanism described in JP2001-347953(A).

The outer column 13 is configured so as to be approximately cylindrical as a whole, and has a slit 18 which extends in the forward-backward direction on its upper surface. The outer column 13 comprises a pair of supported plate sections 19a, 19b in a position where the slit 18 is sandwiched from both sides in the width direction. Each of the pair of supported plate sections 19a, 19b comprises a long hole for telescopic adjustment 20 that extends in the forward-backward direction.

The support bracket 17 has a pair of supporting plate sections 21a, 21b that is spaced apart in the width direction so as to be opposed to each other. Each of the pair of supporting plate sections 21a, 21b comprises a long hole for tilt adjustment 22 that extends in the up-down direction.

An adjustment rod 23 is inserted into the long hole for telescopic adjustment 20 and the long hole for tilt adjustment 22 in the width direction. A nut 24 is screwed into a portion of the tip end section of the adjustment rod 23 that is protruding from the outer surface in the width direction of the supporting plate sections 21a. On the other hand, a base end section of an adjusting lever 25 is fixed to a portion of the base end section of the adjustment rod 23 that is protruding from the outside surface in the width direction of the supporting plate section 21b. A cam apparatus 26 is located between the adjusting lever 25 and the outside surface in the width direction of the supporting plate section 21b. The width dimension of the cam apparatus 26 can be expanded or contracted based on the operation of the adjusting lever 25.

In order to adjust the up/down position or the forward/backward position of the steering wheel, by swinging the adjusting lever 25 in a predetermined direction, the width dimension of the cam apparatus 26 is contracted. By doing this, the frictional force acting on the inside surfaces in the width direction of the pair of supporting plate sections 21a, 21b and the outside surface in the width direction of the pair of supported plate sections 19a, 19b becomes smaller. As a result, it becomes possible to adjust the position of the steering wheel in a range where the adjustment rod 23 is able to be displaced inside each of the long hole for telescopic adjustment 20 and the long hole for tilt adjustment 22.

After adjusting the position of the steering wheel, the adjusting lever 25 is swung in a direction opposite to the predetermined direction so as to expand the width dimension of the cam apparatus 26. By doing this, the frictional force acting between the inside surfaces in the inside surface in the width direction of the pair of supporting plate sections 21a, 21b and the outside surfaces in the width direction of the pair of supported plate sections 19a, 19b becomes larger. As a result, the steering wheel is maintained at a position after adjustment.

RELATED LITERATURE

Patent Literature

[Patent Literature 1] JP2014-104786(A)
[Patent Literature 2] JP2001-347953(A)

SUMMARY OF INVENTION

Problem to be Solved by Invention

In a steering apparatus of conventional structure, an outer column is held by a support bracket only by the frictional force that acts between the inside surface in the width direction of a pair of supporting plate sections of the support bracket and the outside surface in the width direction of a pair of supported plate sections that is provided in the outer column. Therefore, there is still room for improvement in terms of improving ability to hold the outer column by the support bracket.

Taking into consideration the problem described above, the object of the present invention is to achieve construction of an outer column that is capable of further improving ability to hold the outer column by the support bracket.

Means for Solving Problems

The outer column of the present invention is made of an extrusion molded product, and has an axial direction, a width direction that is orthogonal to the axial direction, and a height direction that is orthogonal to the axial direction and the width direction, with an inner column located inside thereof, the outer column comprising:

a pair of side plate sections respectively extending in the axial direction and comprising a column-side through hole that passes through in the width direction on one side of the inner column with respect to the height direction in a part in the axial direction, the pair of side plate sections placed on both sides in the width direction of the inner column, a column pressing section that is provided in at least one side plate section of the pair of side plate sections and is able to press the inner column in a direction away from the column-side through holes with respect to the height direction when displaced inward in the width direction, and a widening section that is provided in the at least one side plate section and is pressed outward in the width direction via the inner column that is pressed by the column pressing section.

Specifically, the column pressing section is placed in a section that is located between the center axis of the inner column and the column-side through hole with respect to the height direction to protrude inward in the width direction, and comprises an inside surface on the pressing side that is inclined in a direction outward in the width direction as going away from the column-side through holes with respect to the height direction and contacts the outer peripheral surface of the inner column directly or via other members.

More specifically, the column pressing section has a triangular tube shape as a whole, and comprises a vertical plate section that is located along the height direction, a horizontal plate section that is located along the width direction, and a swash plate section that is connected to an end section with respect to the height direction of the vertical plate section and an inner end section in the width direction of the horizontal plate section and is provided with the inside surface on the pressing side.

The column pressing section may comprise a reinforcement rib between a connecting section between the vertical plate section and the horizontal plate section, and the swash plate section.

Specifically, the widening section is placed in a section that is opposite to the column-side through hole across the center axis of the inner column with respect to the height direction of the at least one side plate section to protrude inward in the width direction, and comprises an inside surface on the widening side that is inclined in a direction inward in the width direction as going away from the column-side through hole with respect to the height direction.

More specifically, the widening section has a triangular tube shape as a whole, and comprises a vertical plate section that is located along the height direction, a horizontal plate section that is located along the width direction, and a swash plate section that is connected to an end section in the height direction of the vertical plate section and an inner end section in the width direction of the horizontal plate section and is provided with the inside surface on the widening side.

The widening section may comprise a reinforcement rib between a connecting section between the vertical plate section and the horizontal plate section, and the swash plate section.

The outer column of the present invention may comprise a first connecting section that connects one side sections in the height direction of the pair of side plate sections in the width direction, and a second connecting section that connects the other side sections in the height direction of the pair of side plate sections in the width direction.

The first connecting section and the second connecting section may comprise a slit respectively in a range that includes a section aligned with the column-side through hole at least with respect to the axial direction.

The outer column of the present invention may comprise an inside recess section that is recessed outward in the width direction in a range that includes a section aligned with the center axis of the inner column with respect to the height direction of the inside surface in the width direction of the pair of side plate sections.

The outer column of the present invention may comprise an outside recess section that is recessed inward in the width direction in a range that includes a section aligned with the center axis of the inner column with respect to the height direction of the outside surface in the width direction of the pair of side plate sections.

Typical aspect of the outer column of the present invention having an axial direction, a width direction that is orthogonal to the axial direction, and a height direction that is orthogonal to the axial direction and the width direction, comprises:

a pair of side plate sections respectively extending in the axial direction and comprising a column-side through hole passes through in the width direction on one side of the inner column with respect to the height direction in a part in the axial direction, the pair of side plate sections placed on both sides in the width direction of the inner column, a column pressing section that is provided in at least one side plate section of the pair of side plate sections, has a triangular tube shape as a whole, and is placed in a section on the one side with respect to the height direction and between the middle section in the height direction and the column-side through hole of at least one side plate section of the pair of side plate sections to protrude inward in the width direction, the column pressing section comprising a vertical plate section that is located along the height direction, a horizontal plate section that is located along the width direction, and a swash plate section that is connected to an end section with respect to the height direction of the vertical plate section and an inner end section in the width direction of the horizontal plate section and is provided with an inside surface on the pressing side, a widening section that is provided in the at least one side plate section, has a triangular tube shape as a whole, and is placed in a section on the other side with respect to the height direction to protrude inward in the width direction, the widening section comprising a vertical plate section that is located along the height direction, a horizontal plate section that is located along the width direction, and a swash plate section that is connected to an end section with respect to the height direction of the vertical plate section and an inner end section in the width direction of the horizontal plate section and is provided with an inside surface on the widening side, and an intermediate plate section that is provided in the at least one side plate section, and connects the column pressing section and the widening section in the height direction.

In this aspect as well, the column pressing section may comprise a reinforcement rib between the connecting section between the vertical plate section and the horizontal plate section, and the swash plate section. Also, the widening section may comprise a reinforcement rib between the connecting section between the vertical plate section and the horizontal plate section, and the swash plate section.

The outer column of this aspect may comprise a first connecting section that connects one side sections in the height direction of the pair of side plate sections in the width direction, and a second connection section that connects the other side sections in the height direction of the pair of side plate sections in the width direction. Further, the first connecting section and the second connecting section may comprise a slit respectively in a range that includes a section aligned with the column-side through hole with respect to the axial direction.

The outer column of this aspect may comprise an inside recess section that is recessed outward in the width direction in the middle section in the height direction of the inside surface in the width direction of the pair of side plate sections. Further, the outer column of this aspect may comprise an outside recess section that is recessed inward in the width direction in the middle section in the height direction.

The steering apparatus of the present invention is for rotatably supporting a steering shaft, to which a steering wheel is installed.

The steering apparatus comprises:

a support bracket comprising a pair of supporting plate sections that is placed opposite with each other in a width direction of a vehicle and respectively comprises a bracket side through hole that passes through in the width direction of the vehicle, an outer column that is placed between the pair of supporting plate sections with respect to the width direction of the vehicle and comprises a column-side through hole that passes through in the width direction of the vehicle, an inner column that is placed inside the outer column, and an adjustment rod that constitutes a clamp mechanism for switching between a state where position adjustment of the steering wheel is possible and a state where the position of the steering wheel after adjustment is able to be maintained, and is inserted into the bracket side through hole and the column-side through hole in the width direction of the vehicle.

It is characterized in that the outer column is constructed by the outer column of the present invention.

In an aspect of the steering apparatus of the present invention, the outer column is placed on the front side and the inner column is placed on the rear side with respect to the forward-backward direction of the vehicle, and a lower bracket, which is separate from the outer column, is installed in the front-end section of the outer column for inserting the pivot shaft that is placed in the width direction of the vehicle.

In another aspect of the steering apparatus of the present invention, the outer column is placed on the rear side and the inner column is placed on the front side with respect to the forward-backward direction of the vehicle.

In a preferable aspect of the steering apparatus of the present invention, a spacer that is softer than any of the outer column, the inner column, and the support bracket is placed in at least one section of the section between the outer column and the inner column, and the section between the pair of side plate sections of the outer column and the pair of supporting plate sections of the support bracket.

As the spacer, it is possible to use an annular spacer that is placed in a section between the outer column and the inner column. The annular spacer comprises a thick section where the thickness is larger than the other section of the annular spacer in a section that contacts at least one of the inside surface on the pressing side or the inside surface on the widening side. The thick section may comprise a concave groove for retaining lubricating oil.

Alternatively or additionally, as the spacer, it is possible to use a plate-shaped spacer that is placed in a section between the pair of side plate sections of the outer column and the pair of supporting plate sections of the support bracket. The plate-shaped spacer comprises a thick section where the thickness is larger than the other section of the plate-shaped spacer in a section that contacts with the outside surface in the width direction of at least one of the column pressing section or the widening section. The thick section may comprise a concave groove for retaining lubricating oil.

Effect of Invention

With the outer column and the steering apparatus of the present invention, it is possible to further improve the force for maintaining the outer column by the support bracket.

BRIEF DESCRIPTION OF DRAWINGS

FIG. 3(A) is a view that corresponds to the cross section of section A-A in FIG. 1. FIG. 3(B) is a view that corresponds to the cross section of section B-B in FIG. 1.

MODES FOR CARRYING OUT INVENTION

First Example

Figure 12:
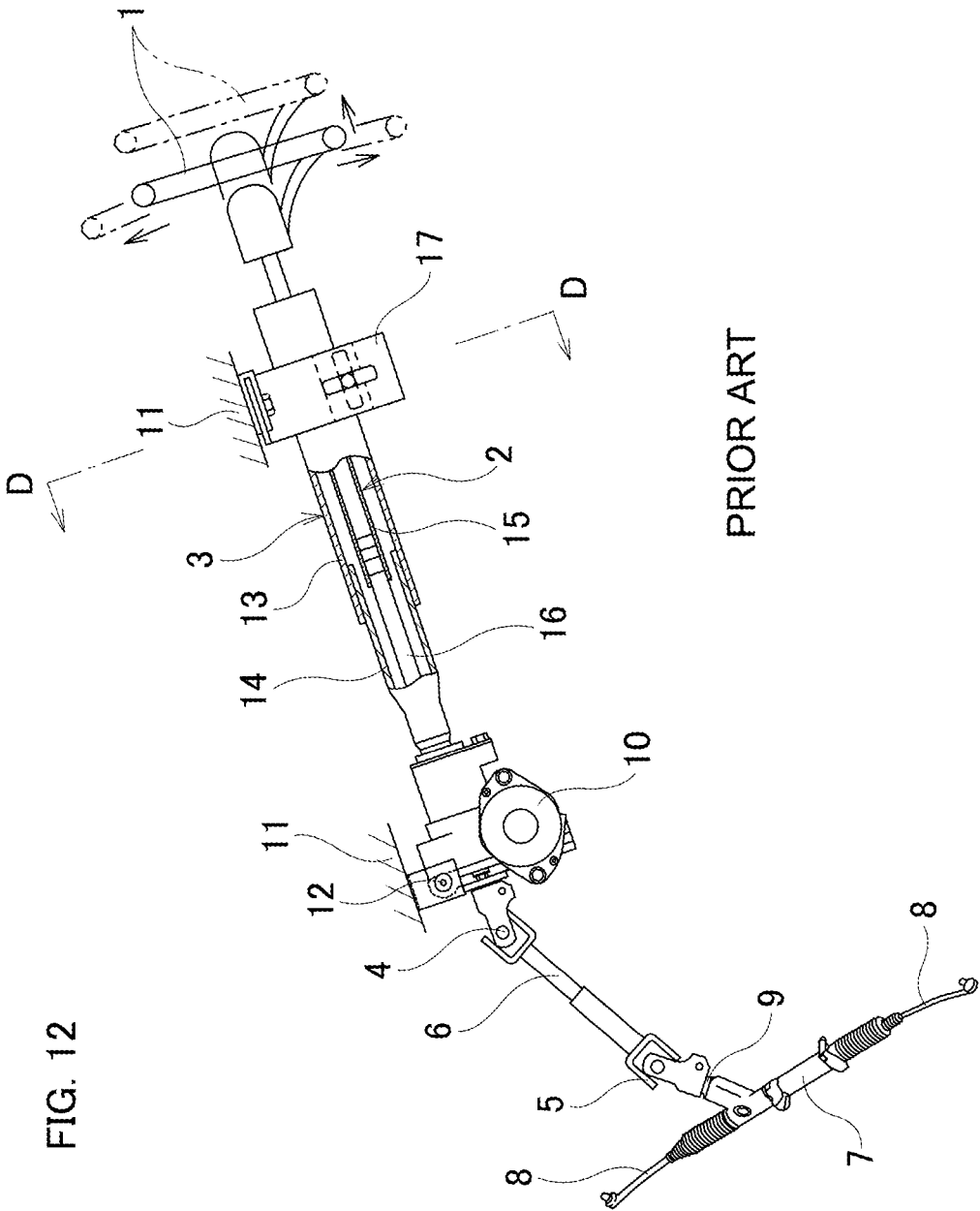
FIG. 12 is a partial cross-sectional view illustrating an example of the steering apparatus of the conventional construction.
Figure 13:
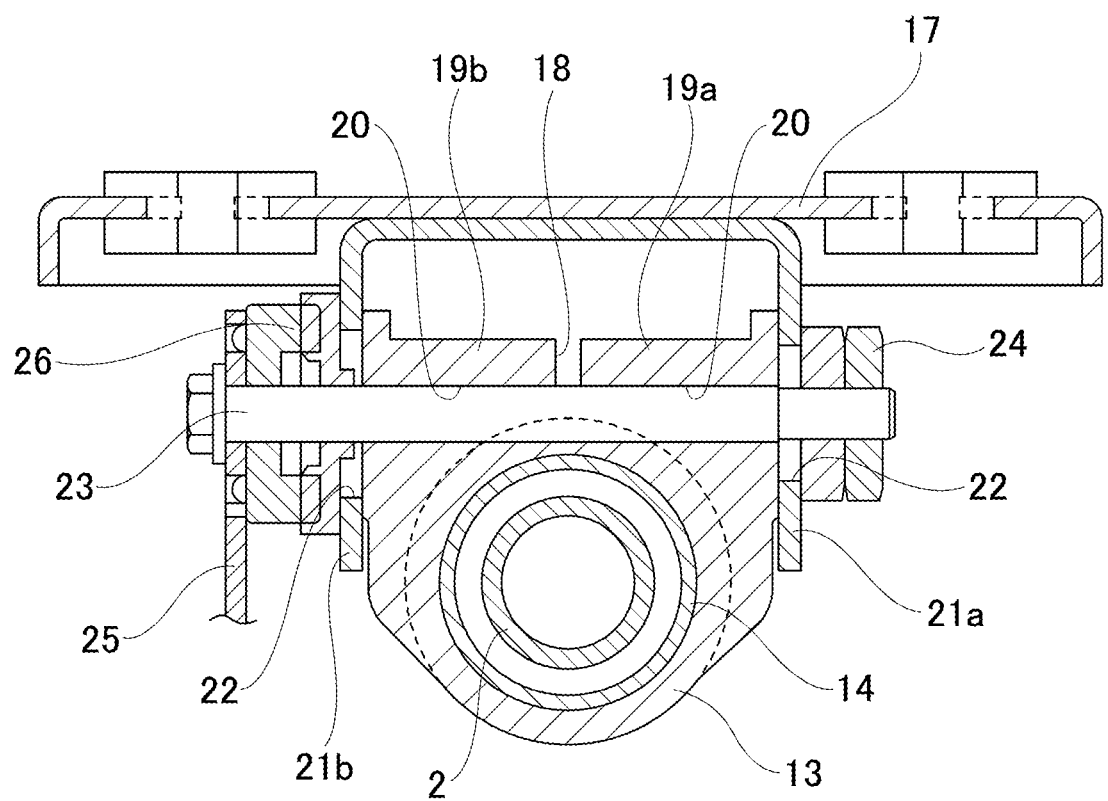
FIG. 13 is a view that corresponds to the cross section of section D-D in FIG. 12 that is illustrated in order to explain the clamp mechanism of the conventional construction.

FIG. 1 to FIG. 4 illustrate a first example of an embodiment of the present invention. The steering apparatus of the present example comprises a steering column 3a, a support bracket 17a, and an adjustment rod 23a constituting a clamp mechanism 49, and rotatably supports a steering shaft 2a to which a steering wheel 1 is installed. Further, the steering apparatus of the present example comprises a telescopic mechanism that enables to adjust the forward/backward position of the steering wheel 1 (see FIG. 12) and a tilt mechanism that enable to adjust the up/down position of the steering wheel 1.

The steering shaft 2a is located inside the steering column 3a, and the steering wheel 1 is installed at the rear-end section of the steering shaft 2a that protrudes backwards from the steering column 3a. The steering shaft 2a comprises an outer shaft 15a and an inner shaft 16a. In the present invention, the outer shaft 15a is located on the front side and the inner shaft 16a is located on the rear side in relation to the forward-backward direction of the vehicle 11. Due to a spline joint between female spline teeth that are formed on the inner circumferential surface of the outer shaft 15a and male spline teeth that are formed on the outer peripheral surface of the inner shaft 16a, the whole length of the steering shaft 2a can be extended and contracted, and torque can be transmitted between the outer shaft 15a and the inner shaft 16a.

The steering column 3a of the steering apparatus of the present example is supported by the vehicle 11 (see FIG. 12) by a pivot shaft 12 that is located at the front-end section and a support bracket 17a that is located in the middle section in the forward-backward direction. The support bracket 17a comprises a pair of supporting plate sections 45a, 45b that is spaced apart so as to be opposed to each other in the width direction of the vehicle. The steering column 3a of the present example comprises an outer column 13a that is located between the pair of supporting plate sections 45a, 45b in the width direction of the vehicle and an inner column 14a that is located inside the outer column 13a. In the present invention, the outer column 13a is located at the front side and the inner column 14a is located at the rear side in the forward-backward direction of the vehicle 11. The front section of the inner column 14a is located on the inside the rear section of the outer column 13a so as to be able to relatively displace in the forward-backward direction so that the whole length of the steering column 3a can be extended and contracted.

The inner column 14a is constructed by an electro-resistance-welded tube or a drawn tube which is made of iron-alloy, or light alloy such as aluminum alloy and magnesium alloy, and has a cylindrical shape as a whole, and has a center axis O, which extends in the forward-backward direction, in the center section of the cylindrical cross section.

On the other hand, the outer column 13a of the present example is an extrusion molded product which is formed to be integral by extruding material made of light alloy such as aluminum alloy. Therefore, excluding the section where machining such as cutting is performed after extrusion molding, the outer column 13a has a cross-sectional shape that does not change over the entire length of the forward-backward direction that corresponds to the extrusion direction.

The outer column 13a has an approximately rectangular tube shape as a whole, and comprises a pair of side plate sections 27a, 27b that constitutes the left and right sides of the cross section of the approximately rectangular tube shape, and an upper connection section 28 and a lower connection section 29 that constitutes the upper and lower sides thereof. The outer column 13a has an axial direction that corresponds to the extrusion direction (forward-backward direction), a width direction (left-right direction in the cross section), and a height direction (up-down direction in the cross section) that is orthogonal to the axial direction and the width direction. An accommodation space 30 is formed within the outer column 13a where all sides are surrounded by the pair of side plate sections 27a, 27b, the upper connection section 28, and the lower connection section 29 for locating the inner column 14a.

The pair of side plate sections 27a, 27b respectively extends in the axial direction, and is located on both outer sides in the width direction of the inner column 14a so as to be spaced apart from each other. The pair of side plate sections 27a, 27b extend over the whole length of the outer column 13a.

Each of the pair of side plate sections 27a, 27b comprises a column-side through hole 31 that is formed by cutting near at the rear end section which is part of the axial direction as well as at the lower end section on one side of the inner column 14a in relation to the height direction, the column-side through hole 31 passing through in the width direction. These column-side through holes 31 are located coaxially with each other and each of the column-side through holes 31 has a simple circular hole shape.

In the outer column 13a of the present example, each of the pair of side plate sections 27a, 27b comprises a hook 32, widening section 33, an intermediate plate section 34, a column pressing section 35, and a bolt housing section 36 from the upper side which corresponds to the other side from the inner column 14a in relation to the height direction. The respective cross-sectional shape of the pair of side plate sections 27a, 27b comprising these hook 32, widening section 33, intermediate plate section 34, column pressing section 35, and bolt housing section 36 is the same along the axial direction except the section where the column-side through hole 31 is provided, and the pair of side plate sections 27a, 27b are located symmetrically with respect to the width direction.

The hook 32 has a L-shaped cross section, and is provided at the upper end over the entire length of each of the side plate sections 27a, 27b.

The widening section 33 is placed on a section near the upper end of each of the side plate sections 27a, 27b, which is located on the other side from the column-side through hole 31 across center axis O with respect to the height direction (the other side from the middle section in the height direction of the side plate sections 27a, 27b with respect to the height direction), so as to protrude inward in the width direction. Each of the widening sections 33 has a hollow triangular tube shape as a whole, and its cross section has an approximately right triangle shape (wedge shape). Each of the widening sections 33 has a first vertical plate section 33a that is located along the height direction, and a first horizontal plate section 33b that is located in the width direction, and a first swash plate section 33c that is connected to the lower end sections of the first vertical plate section 33a and the inner end section in the width direction of the first horizontal plate section 33b. Further, in the present example, each of the widening sections 33 comprises a first reinforcement rib 33d that extends in a direction that is orthogonal to the center section of the first swash plate section 33c between the connecting section between the upper end section of the first vertical plate section 33a and the outer end section in the width direction of the first horizontal plate section 33b, and the center section of the first swash plate section 33c.

Figure 1:
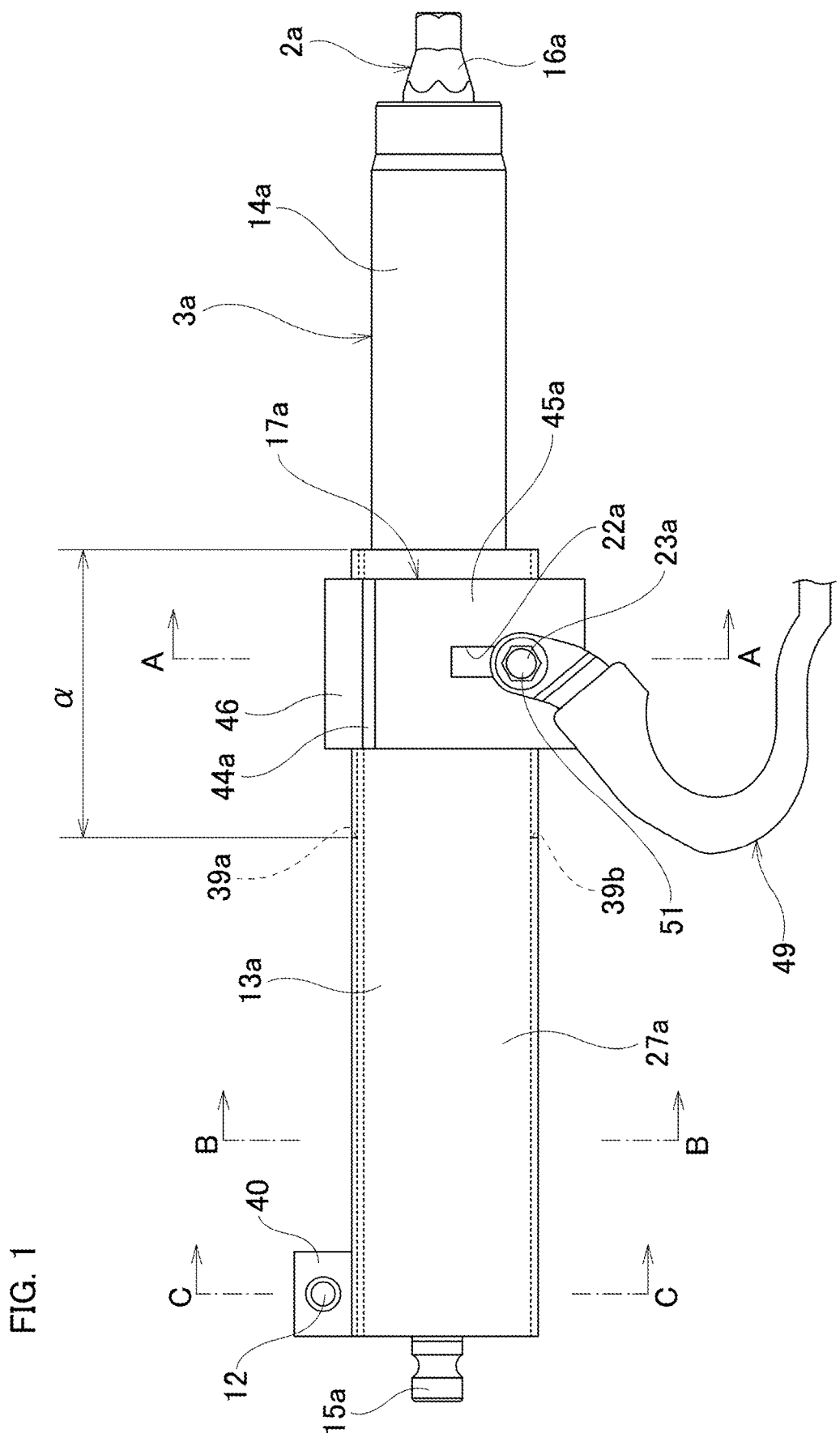
FIG. 1 is a side view of a steering apparatus illustrating a first example of an embodiment of the present invention.
Figure 2:
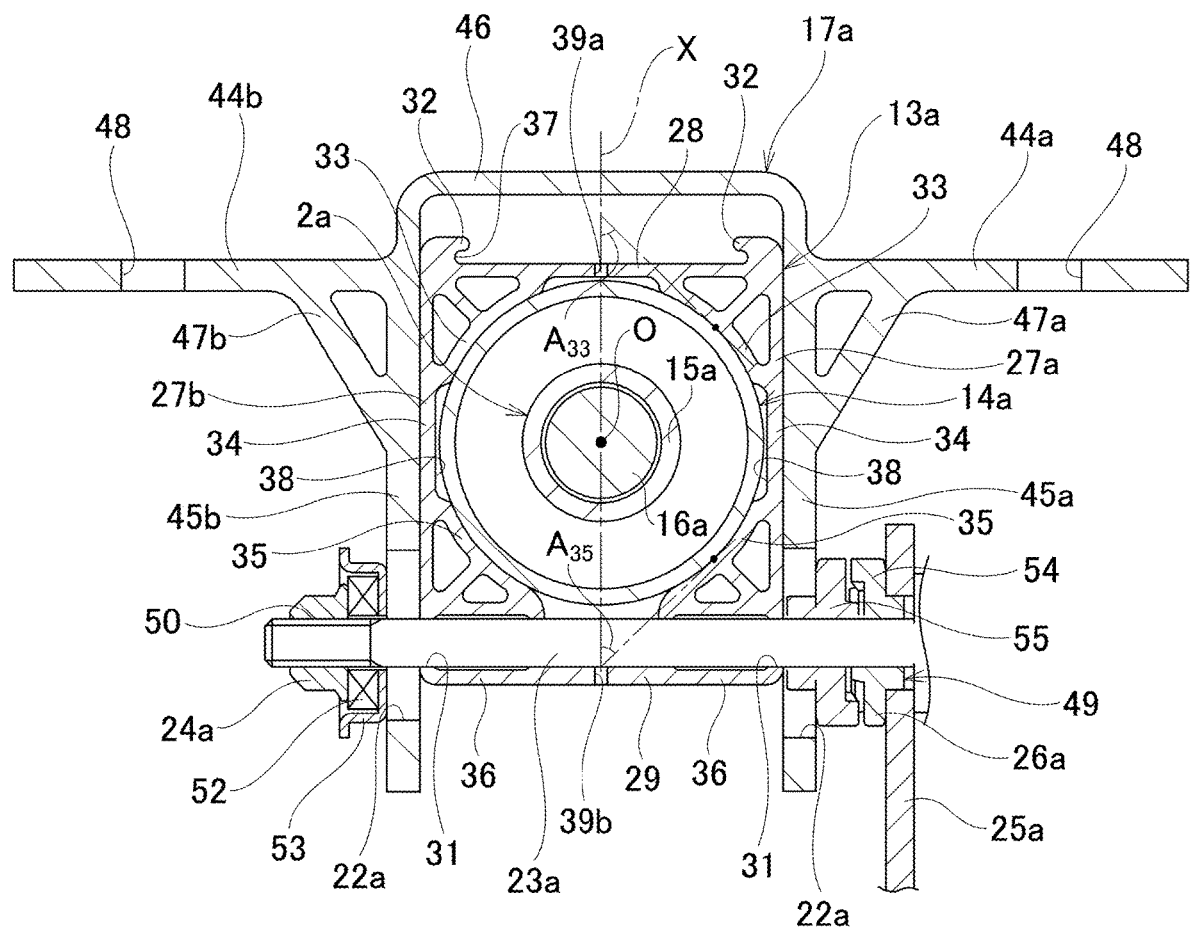
FIG. 2 a cross sectional view of section A-A in FIG. 1 illustrating the first example of the embodiment of the present invention.
Figure 3:
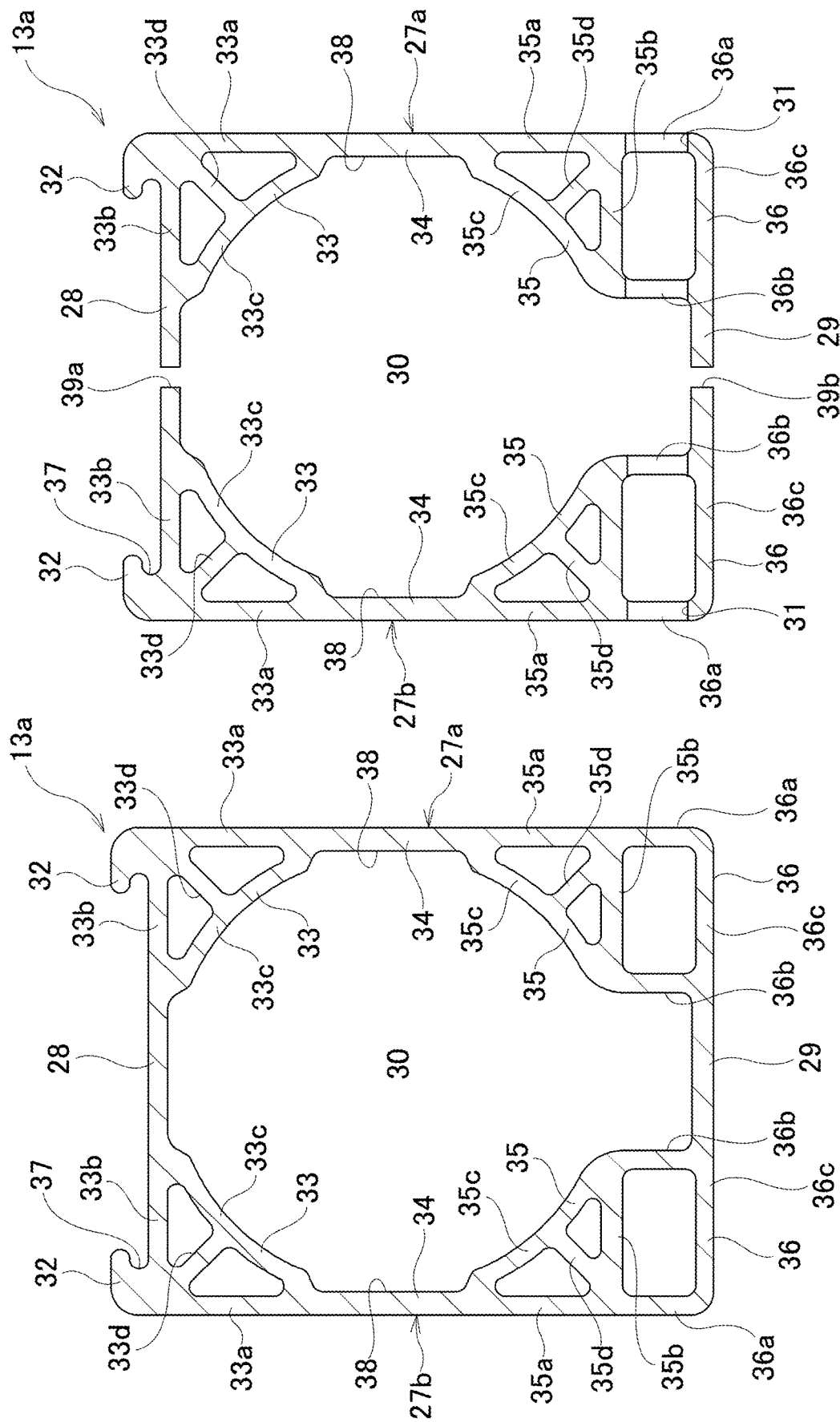
FIG. 3(A) and FIG. 3(B) are cross sectional views illustrating an outer column taken out from the first example of the embodiment of the present invention.
Figure 4:
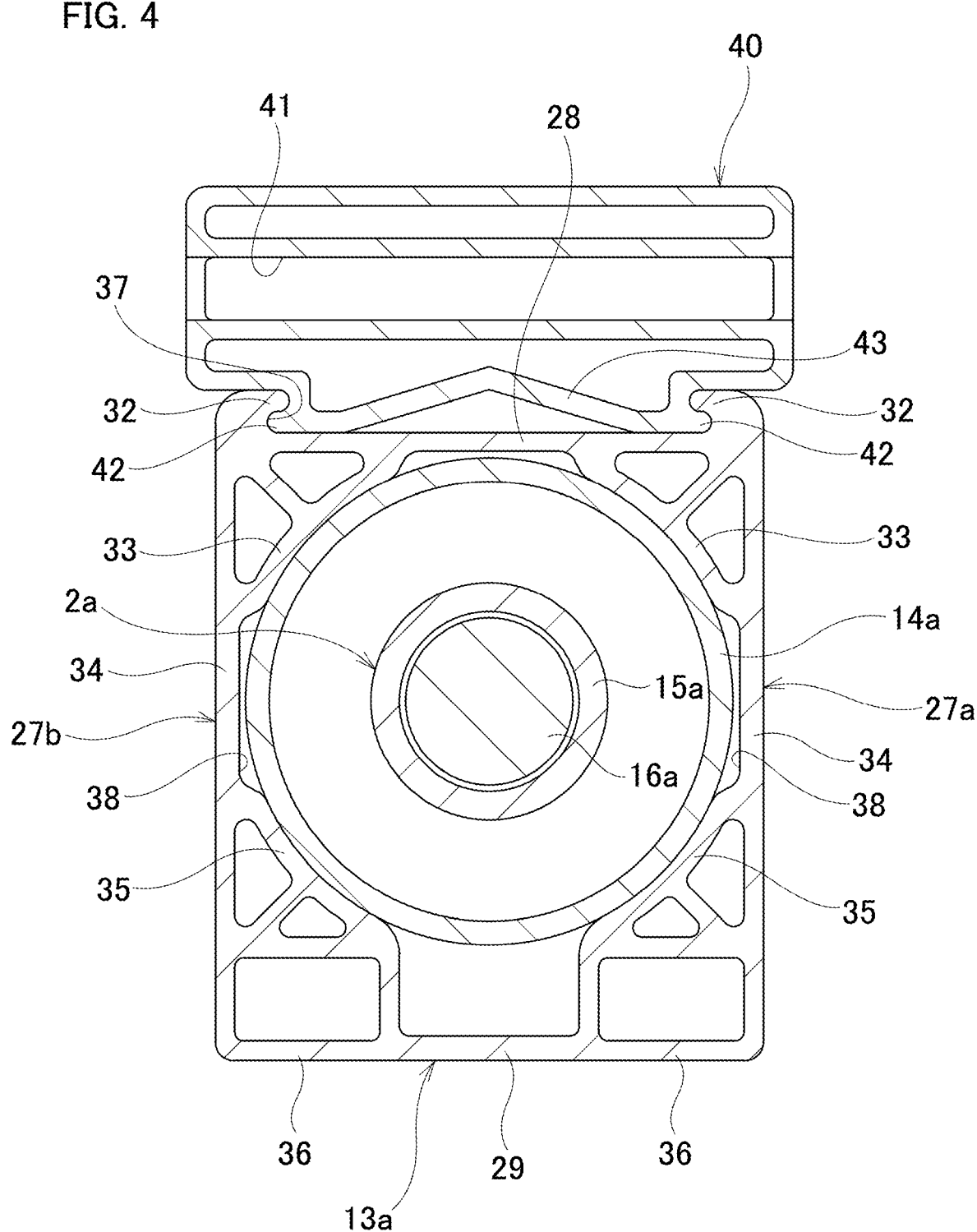
FIG. 4 is a cross sectional view of section C-C in FIG. 1 illustrating the first example of the embodiment.

Each of the widening sections 33 comprises an inside surface on the widening side that is inclined in a direction inward in the width direction as going away from the column-side through hole 31 (toward the other side in the height direction) with respect to the height direction, and corresponds to a section that comes in contact with the outer peripheral surface of the inner column 14a. In the present example, the inside surface on the widening side of the widening section 33 is provided in the first swash plate section 33c. More specifically, the inside surface of the first swash plate section 33c that constitutes the inside surface on the widening side is inclined so as to curve in a direction inward in the width direction at greater distance from the column-side through hole 31 with respect to the up-down direction. Therefore, the space between the inside surfaces in the width direction of the pair of widening sections 33 becomes smaller toward the top. In the illustrated example, the inclination angle of the tangent of the center section of the inside surface on the widening side of each of the widening sections 33 is 45 degrees respectively based on the virtual plane X that is orthogonal to the center axis of the column-side through hole 31. Here, as illustrated in FIG. 2, the inclination angle $A_{33}$ of the widening section 33 based on the virtual plane X can be set arbitrarily, but it is possible to be set within a range of 1 degree to 50 degrees, preferably within a range of 30 degrees to 45 degrees. Further, the radius of curvature of the inside surface on the widening side of the widening section 33 is equal to the outer radius of the inner column 14a.

The column pressing section 35 is placed in a section near the lower end of each of the side plate sections 27a, 27b that is located between the center axis O of the inner column 14a and the column-side through hole 31 with respect to the height direction (one side from the middle section in the height direction of the side plate sections 27a, 27b with respect to the height direction) so as to protrude inward in the width direction. Each of the column pressing sections 35 has a hollow triangular tube shape as a whole, and its cross section has an approximately right triangle shape (wedge shape). Each of the column pressing sections 35 has a second vertical plate section 35a that is located along the height direction, a second horizontal plate section 35b that is located along the width direction, and a second swash plate section 35c that is connected to the upper end section of the second vertical plate section 35a and the inner end section in the width direction of the second horizontal plate section 35b. Further, in the present example, each of the column pressing sections 35 comprises a second reinforcement rib 35d between the connecting section between the lower end section of the second vertical plate section 35a and the outer end section in the width direction of the second horizontal plate section 35b, and the center section of the second swash plate section 35c, and second reinforcement rib 35d extends in a direction that is orthogonal to the center section of the second swash plate section 35c.

Each of the column pressing sections 35 comprises an inside surface on the pressing side that is inclined in a direction outward in the width direction as going away from the column-side through hole 31 (toward the outer side from one end section in the height direction) with respect to the height direction, and corresponds to a section that comes in contact with the outer peripheral surface of the inner column 14a. In the present example, the inside surface on the pressing side of the column pressing section 35 is provided in the second swash plate section 35c. More specifically, the inside surface of the second swash plate section 35c that constitutes the inside surface on the pressing side is inclined so as to curve in a direction outward in the width direction at the greater distance from the column-side through hole 31 with respect to the up-down direction. Therefore, the space between the inside surfaces in the width direction of the pair of column pressing sections 35 becomes larger toward the top. In the illustrated example, the inclination angle of the tangent of the center section of the inside surface on the pressing side of each of the column pressing sections 35 is 45 degrees respectively. Here, as illustrated in FIG. 2, the inclination angle $A_{35}$ of the column pressing section 35 based on the virtual plane X can be set arbitrarily, but it is possible to be set within a range of 15 degrees to 85 degrees, preferably within a range of 30 degrees to 60 degrees. Further, the radius of curvature of the inside surface on the pressing side of the column pressing section 35 is equal to the outer radius of the inner column 14a. In the present example, the inside surface on the pressing side of the column pressing section 35 and the inside surface on the widening side of the widening section 33 exist on the same virtual cylindrical surface. Therefore, the accommodation space 30 of the inner column 14a that is formed inside the outer column 13a has an approximately column shape.

The intermediate plate section 34 has a flat plate shape, and is provided in a section between the lower end section of the widening section 33 and the upper end section of the column pressing section 35, as well as in a range that includes a section that is aligned with the center axis O of the inner column 14a with respect to the height direction (the middle section in the height direction), and connects the widening section 33 and the column pressing section 35 in the height direction. Specifically, the intermediate plate section 34 is located along the height direction so as to be located on the same plane as the first vertical plate section 33a of the widening section 33 and the second vertical plate section 35a of the column pressing section 35. The inside surface of the intermediate plate section 34 is a flat surface that is parallel to the virtual place X, and the distance to the center axis O of the inner column 14a is larger than the outer radius of the inner column 14a. Therefore, the inside surface of the intermediate plate section 34 constitutes an inside recess section 38 that is recessed outside in the width direction than the inside surface on the widening side of the widening section 33 and the inside surface on the pressing side of the column pressing section 35, and a gap exists between the inside surface of the intermediate plate section 34 and the outer peripheral surface of the inner column 14a.

The bolt housing section 36 is located at each of the lower end sections of the side plate sections 27a, 27b. The bolt housing section 36 has an outer plate section 36a and an inner plate section 36b that extend downward from both end sections in the width direction of the second horizontal plate section 35b of the column pressing section 35 respectively, and a bottom plate section 36c that connects the lower end sections of the outer plate section 36a and the inner plate section 36b. Each of the outer plate section 36a and the inner plate section 36b of the bolt housing section 36 comprises a column-side through hole 31 that passes through in the width direction near its rear end. The height dimension from the top surface of the bottom plate section 36c to the bottom surface of the second horizontal plate section 35b, which is a dimension in the up-down direction of the internal space of the bolt housing section 36, is slightly larger than the diameter of the column-side through hole 31.

In the present example, the sections near the upper end of the pair of side plate sections 27a, 27b are connected by an upper connection section 28 that has a flat plate shape and is located along the width direction. Specifically, the upper connection section 28 connects the inner end sections in the width direction of the first horizontal plate sections 33b of the pair of side plate sections 27a, 27b in the width direction. Further, the lower end sections of the pair of side plate sections 27a, 27b are connected in the width direction by a lower connection section 29 that has a flat plate shape and is located along the width direction. Specifically, the lower connection section 29 connects the inner end sections in the width direction of the second horizontal plate sections 35b of the pair of side plate sections 27a, 27b in the width direction. The upper connection section 28 and the lower connection section 29 are formed by extrusion molding, so the cross-sectional shape is the same along the forward-backward direction except the section where slits 39a, 39b, which will be explained later, are formed. Here, in the present example, the lower connection section 29 that is located on the column-side through hole 31 side (lower side in the height direction) corresponds to the first connecting section that connects the one side sections in the height direction of the pair of side plate sections 27a, 27b in the width direction, and the upper connecting section 28 that is located on the other side of the column-side through hole 31 (upper side in the height direction) corresponds to the second connecting section that connects the other side sections in the height direction of the side plate sections 27a, 27b.

In the present example, the top surface of the outer column 13a is constructed by the top surface of the first horizontal plate section 33b of the widening section 33 of the pair of side plate sections 27a, 27b and the top surface of the upper connection section 28. The outer column 13a comprises a fastening concave groove 37, which has a mortise shape having a width dimension that becomes smaller at the opening section compared to that of the bottom section that is formed by the top surface of the outer column 13a, between a pair of hooks 32 at its upper end section.

The upper connection section 28 comprises an upper slit 39a that is formed by cutting, and the lower connection section 29 comprises a lower slit 39b that is formed by cutting. The upper slit 39a and the lower slit 39b are located in sections that exist on the rear side section of the outer column 13a of the upper connection section 28 and the lower connection section 29. Specifically, the upper slit 39a and the lower slit 39b are formed in a range that is shown by an arrow α in FIG. 1, from the rear end edge section of the outer column 13a to a section located slightly ahead of the front edge of each of the supporting plate sections 45a, 45b with respect to the forward-backward direction (axial direction of the outer column) of the upper connection section 28 and the lower connection section 29. Therefore, not only a section aligned with the column-side through hole 31 with respect to the forward-backward direction (axial direction of the outer column), but also a section that align with each of the supporting plate sections 45a, 45b of the support bracket 17a are included within the range where the upper slit 39a and the lower slit 39b are formed. In the present example, not only both top upper and lower sides of the upper slit 39a and the lower slit 39b are open, but also the rear-end sections thereof are open. Further, the upper slit 39a and the lower slit 39b are formed in the center section in the width direction of the upper connection section 28 and the lower connection section 29, and the width dimension (opening width) of each of the upper slit 39a and the lower slit 39b is smaller than the width dimension of the upper connection section 28 and the lower connection section 29.

In the present example, the upper slit 39a and the lower slit 39b are formed in a rear side section which is a part in the forward-backward direction of the upper connection section 28 and the lower connection section 29 that corresponds to a range that includes a section that is aligned with the column-side through hole 31 with respect to the axial direction of the outer column 13a, therefore, the outer column 13a has two cross-sectional shapes: a cross-sectional shape that is non-continuous in the circumferential direction shown in FIG. 3(B), and a cross-sectional shape that is continuous in the circumferential direction (closed in the circumferential direction) shown in FIG. 3(A).

In the present example, the outer column 13a is located on the front side and the inner column 14a is located on the rear side with respect to the forward-backward direction of the vehicle, and a lower bracket 40 that is separate from the outer column 13a is installed at the upper section of the front-end section of the outer column 13a. The lower bracket 40 is located in the width direction, and comprises an insertion hole 41 for inserting the pivot shaft that is fixed to the vehicle 11. Further, the lower bracket 40 comprises a locking section 43 having a pair of flange sections 42 that protrude on both sides in the width direction on its lower end section. In the present example, the lower bracket 40 is enabled to be installed on the top surface of the front-end section of the outer column 13a by engaging the locking section 43 with the fastening concave grooves 37 that are formed by a pair hooks 32 that are provided at the upper end section of the outer column 13a. Here, it is also possible to form the lower bracket by extrusion molding so as to be integral with the outer column.

The support bracket 17a is made of an extrusion molded product that is formed by extruding material made of light alloy such as aluminum, or by pultrusion so as to be integral, and is located in the middle section in the forward-backward direction of the steering column 3a as well as around the rear side section of the outer column 13a. The support bracket 17a comprises a pair of installation plate sections 44a, 44b so that the support bracket 17a itself is supported by and fastened to the vehicle, a pair of supporting plate sections 45a, 45b, that are spaced apart so as to be opposed to each other in the width direction of the vehicle, for holding the outer column 13a from both sides in the width direction, a bridge section 46, and a pair of reinforcement plates 47a, 47b.

The pair of installation plate sections 44a, 44b are respectively located horizontally on the both side sections in the width direction of the support bracket 17a. Further, in order for the support bracket 17a to be undetachably supported by and fastened to the vehicle 11, each of the installation plate sections 44a, 44b comprises an installation hole 48 that passes through in the up-down direction in an approximately center section in its width direction for inserting bolts or studs that are not shown.

The pair of supporting plate sections 45a, 45b extend downward respectively from the inner end section in the width direction of the pair of installation plate sections 44a, 44b. The pair of supporting plate sections 45a, 45b are located on both sides in the width direction of the pair of side plate sections 27a, 27b of the steering column 3a. Each of the supporting plate sections 45a, 45b comprises a long hole for tilt adjustment 22a that passes through in the width direction as a bracket side through hole. The long hole for tilt adjustment 22a has a partial arc shape around the adjustment rod 23a.

The bridge section 46 has an inverted U shaped cross section and is provided in the center section in the width direction of the support bracket 17a. The bridge section 46 connects the inner end sections in the width direction of the pair of installation plate sections 44a, 44b in the width direction.

The pair of reinforcement plates 47a, 47b are provided to cross over at an angle between each bottom surface of the installation plate sections 44a, 44b and each outside surface in the width direction of the supporting plate sections 45a, 45b. In the present example, the reinforcement plates 47a, 47b are provided over the whole length in the forward-backward direction of the support bracket 17a, however, it is also possible to be provided, for example, in a directly above section of the long hole for tilt adjustment 22a, that is, in a range that aligns with the long hole for tilt adjustment 22a with respect to the forward-backward direction. The each thickness of the reinforcement plates 47a, 47b is approximately the same as each thickness of the supporting plate sections 45a, 45b. Further, in the present example, the inclination angle based on the virtual plane X of the reinforcement plates 47a, 47b is set to be 30 degrees respectively, however, the inclination angle of the reinforcement plates 47a, 47b can be arbitrarily set within a range of over 0 degrees and less than 90 degrees.

The clamp mechanism 49 has a function to switch between a state where position adjustment of the steering wheel 1 is possible and a state where the position of the steering wheel after adjustment is able to be maintained, and comprises an adjustment rod 23a, an adjusting lever 25a, and a cam apparatus 26a which is a scaling mechanism.

The adjustment rod 23a of the clamp mechanism 49 is formed by a rod-shaped member made of iron, and is inserted into the long holes for tilt adjustment 22a and the column-side through hole 31 in the width direction. At the tip end section of the adjustment rod 23a, a thrust bearing 52 and the pressing plate 53 are located around the section protruding in the width direction from the outside surface in the width direction of the supporting plate sections 45b. Nut 24a is screwed onto a male screw section 50 on the tip end section of the adjustment rod 23a. An engagement piece (not shown) is provided on the inside surface of the pressing plate 53, and this engagement piece is engaged with the long hole for tilt adjustment 22a that is formed in the supporting plate sections 45b so as to be able to displace only along the long hole for tilt adjustment 22a.

A head section 51 is provided in the base end section of the adjustment rod 23a. An adjusting lever 25a and a cam apparatus 26a are located around a section that protrudes in the width direction from the outside surface in the width direction of the supporting plate sections 45a in a section near the base end of the adjustment rod 23a. The adjusting lever 25a is engaged so that its base end section is not able to relatively rotate with respect to the adjustment rod 23a. The cam apparatus 26a scales the width dimension based on the relative rotation of the driving-side cam 54 and the driven-side cam 55, and the driven-side cam 55 is engaged with the long hole for tilt adjustment 22a that is formed in the supporting plate section 45a so as to be able to displace only along the long hole for tilt adjustment 22a (in a state where rotation is prevented). On the other hand, the driving-side cam 54 is able to rotate synchronized with the adjustment rod 23a due to the adjusting lever 25a.

The clamp mechanism 49 is able to scale the space between the inside surface in the width direction of the pressing plate 53 and the inside surface in the width direction of the driven-side cam 55, which correspond to a pair of pressing sections, by scaling the width dimension of the cam apparatus 26a based on the operation of the adjusting lever 25a.

Next, operation of each part of the steering apparatus of the present example when maintaining the steering wheel 1 in a position after adjustment will be explained in detail.

First, when the adjusting lever 25a is rotated upward (lock direction) from a state where the position of the steering wheel 1 can be adjusted, the width dimension of the cam apparatus 26a becomes large as the distance between the driving-side cam 54 and the driven-side cam 55 becomes larger. Due to this, the space between the inside surface in the width direction of the driven-side cam 55 and the inside surface in the width direction of the pressing plate 53 becomes contracted.

When the space between the inside surface in the width direction of the driven-side cam 55 and the inside surface in the width direction of the pressing plate 53 is contracted, the pair of supporting plate sections 45a, 45b of the support bracket 17a elastically deform so as to get each of the lower end sections closer. At the same time, the pair of side plate sections 27a, 27b of the outer column 13a are pressed toward inside in the width direction by the pair of supporting plate sections 45a, 45b. Due to this, sections of the side plate sections 27a, 27b that align with the supporting plate sections 45a, 45b respectively with respect to the forward-backward direction elastically deform toward inside in the width direction so as to get each of the lower end sections closer. When doing this, the width dimension of the lower slit 39b becomes smaller.

When the side plate sections 27a, 27b elastically plastically deform respectively as stated above, the pair of column pressing sections 35 displace toward inside in the width direction so as to be closer to each other. The inside surface on the pressing side of the second swash plate section 35c of the column pressing section 35 is inclined in a direction outward in the width direction toward the above, so as to be able to transform the displacement toward inside in the width direction of the column pressing section 35 (force of inward in the width direction) into force for pressing the inner column 14a upward. As a result, the inside surface on the pressing side of the second swash plate section 35c presses the inner column 14a upward.

The inner column 14a that displaces upward presses the pair of widening sections 33 so as to press the pair of widening sections 33 toward outside in the width direction to expand. When doing this, the width dimension of the upper slit 39a becomes larger. The inside surface on the widening side of the first swash plate section 33c of the widening section 33 is inclined in a direction inward in the width direction toward the above, so it is possible to transform the upward displacement of the inner column 14*a* (upward force) into force that presses the widening section 33 so as to expand toward outside in the width direction. As a result, each of the pair of widening sections 33 is strongly held between the inside surface in the width direction of the pair of supporting plate sections 45*a*, 45*b* and the outer peripheral surface of the inner column 14*a*. Therefore, in the present example, a total of four locations of the outer column 13*a*, that is, the column pressing sections 35 and the widening sections 33 can be strongly supported by the support bracket 17*a*.

On the other hand, it is possible to apply pressure to two locations that are apart in the circumferential direction of the upper half section of the inner column 14*a* from the pair of widening sections 33, and is possible to apply pressure to two locations that are apart in the circumferential direction of the lower half section of the inner column 14*a* from the pair of column pressing sections 35. Therefore, in the present example, it is possible to support the inner column 14*a* at a total of four locations of the outer column 13*a*, that is, the column pressing sections 35 and the widening sections 33.

On the other hand, in order to be able to adjust the position of the steering wheel 1, the adjusting lever 25*a* is rotated downward (unlock direction) from a state where the position of the steering wheel 1 is maintained. Then, make the width dimension of the cam apparatus 26*a* smaller to expand the space between the inside surface in the width direction of the pressing plate 53 and the inside surface in the width direction of the driven-side cam 55. Due to this, the pair of supporting plate sections 45*a*, 45*b* and the pair of side plate sections 27*a*, 27*b* are both back to a free state from an elastic deformation state.

As the side plate sections 27*a*, 27*b* elastically recover and the column pressing sections 35 displace in the width direction respectively, the force of the column pressing section 35 that presses the inner column 14*a* upward is released and the inner column 14*a* displaces (evacuates) downward. Accordingly, the force affecting the widening section 33 to expand toward outside in the width direction is also released. Due to this, the widening section 33 is no longer strongly held between the outer peripheral surface of the inner column 14*a* and the inside surface in the width direction of the supporting plate sections 45*a*, 45*b*. Further, the pressing force (maintaining force) that was affecting the inner column 14*a* from the widening sections 33 and the column pressing sections 35 is lost as well. As a result, it becomes a state where adjustment of the position of the steering wheel 1 is possible in the forward-backward direction and the up-down direction.

With the steering apparatus of the present example, it is possible for the maintaining force of the outer column 13*a* to be further improved by the support bracket 17*a*. That is, when maintaining the steering wheel 1 in a position after adjustment, the space between the inside surfaces on the widening side of the pair of widening sections 33 that are held between the inside surfaces in the width direction of the pair of supporting plate sections 45*a*, 45*b* and the outer peripheral surface of the inner column 14*a* is made smaller toward the direction of displacement (upward) of the inner column 14*a*. Therefore, it is possible to strongly hold the pair of widening sections 33 between the inside surfaces in the width direction of the supporting plate sections 45*a*, 45*b* and the outer peripheral surface of the inner column 14*a* due to wedge effect.

Further, in the present example, the widening sections 33 are pressed against the upper end sections of the supporting plate sections 45*a*, 45*b* which are the connecting side sides between the installation plate sections 44*a*, 44*b* and have high regidity with respect to the width direction. Furthermore, the reinforcement plates 47*a*, 47*b* are located between each of the outside surfaces in the width direction of the supporting plate sections 45*a*, 45*b* and each of the bottom surfaces of the installation plate sections 44*a*, 44*b* so as to bridge the reinforcement plates 47*a*, 47*b*. Therefore, as it is effectively prevented that each of the supporting plate sections 45*a*, 45*b* plastically deforms toward outside in the width direction based on the pressing force of the widening section 33, it is possible to sufficiently increase the surface pressure between the both side surfaces in the width direction of the widening section 33 and the inside surfaces in the width direction of the supporting plate sections 45*a*, 45*b* and the outer peripheral surface of the inner column 14*a*. Therefore, with the present example, it is possible to further improve the maintaining force of the outer column 13*a* by the support bracket 17*a*.

Further, in the present example, it is possible to efficiently transmit the upward pressing force that effects the inner column 14*a* to the widening section 33 as the inside recess section 38 is provided in a section that is adjacent below the widening section 33 of each of the side plate sections 27*a*, 27*b*. For example. when the inside recess section 38 is not provided, the outer peripheral surface of the inner column 14*a* is restrained by the middle section in the up-down direction of the inside surface in the width direction of the side plate sections 27*a*, 27*b*, and there is a probability that the force cannot be transmitted efficiently to the widening section 33 from the inner column 14*a* as the inner column 14*a* is deformed in the width direction so as to collapse. On the other hand, in the present example, the outer peripheral surface of the inner column 14*a* and the middle sections in the up-down direction of the inside surfaces in the width direction of the side plate sections 27*a*, 27*b* do not contact based on the existence of the inside recess sections 38, it is possible to efficiently transmit force to the widening section 33 from the inner column 14*a*. Therefore, it is possible to strongly press the widening sections 33 to the inside surfaces in the width direction of the supporting plate sections 45*a*, 45*b*.

Further, in the present example, although the widening section 33 and the column pressing section 35 are formed as a hollow cylinder respectively, reinforcement rib 33*d*, 35*d* are provided inside the widening section 33 and the column pressing section 35 respectively. Therefore, it is possible to effectively prevent plastic deformation of the first swash plate section 33*c* and the second swash plate section 35*c* based on the contact between the first and second swash plate sections 33*c*, 35*c* and the inner column 14*a*. Therefore, the force to hold the widening section 33 between the inside surfaces in the width direction of the supporting plate sections 45*a*, 45*b* and the outer peripheral surface of the inner column 14*a* can be larger. Further, the force pressing the inner column 14*a* upward by the column pressing section 35 can be larger.

Further, as the reinforcement plates 47*a*, 47*b* are provided to the support bracket 17*a* respectively, it is possible to increase rigidity with respect to the width direction of the supporting plate sections 45*a*, 45*b* respectively. Therefore, it is possible to increase support rigidity with respect to the width direction of the steering column 3*a*.

Further, in the present example, as the outer column 13*a* is made of an extrusion molded product, not only is it possible to shorten the work hour that is required to manufacture the outer column 13a, but also to simplify the work process. Further, as the widening section 33 and the column pressing section 35 of the outer column 13a are made hollow, it is also possible to make the outer column 13a more lightweight.

Second Example

Figure 5:
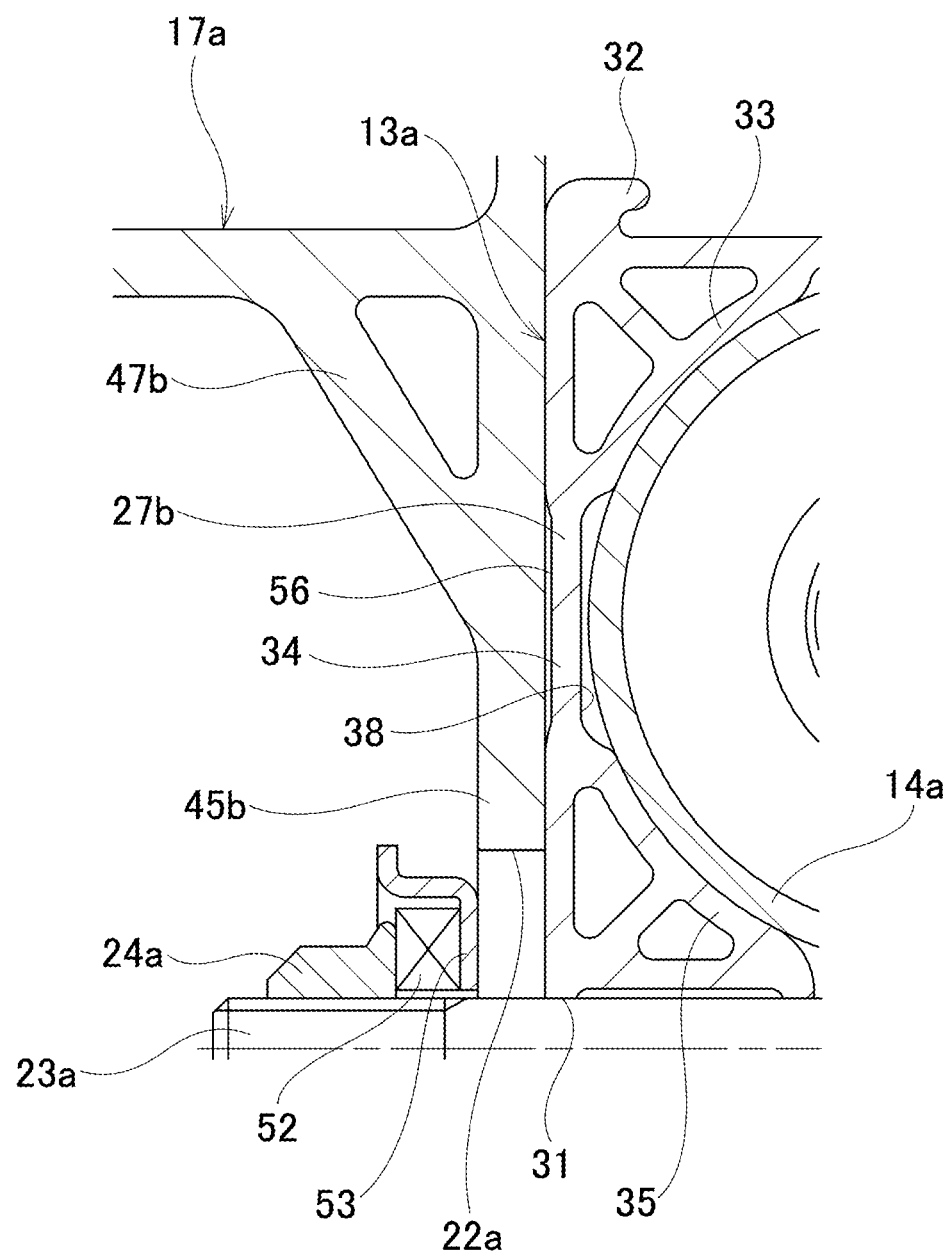
FIG. 5 is a view that corresponds to left half of FIG. 2 illustrating a second example of the embodiment.

FIG. 5 illustrates a second example of an embodiment of the present invention. In the present example, each of the pair of side plate sections 27a, 27b of the outer column 13a comprises an outside recess 56 that is recessed inward in the width direction on the outside surface in the width direction of the intermediate plate section 34. Due to this, the flexural rigidity of the intermediate plate section 34 is low.

In the present example, when clamping the steering wheel 1 in the adjusted position, it is possible to make the pair of widening sections 33 easy to replace outward in the width direction by the upward pressing force that affects from the inner column 14a. Due to this, it becomes easy to support the outer column 13a at four points by the support bracket 17a. Other construction and function are the same as in the first example of the embodiment.

Third Example

Figure 6:
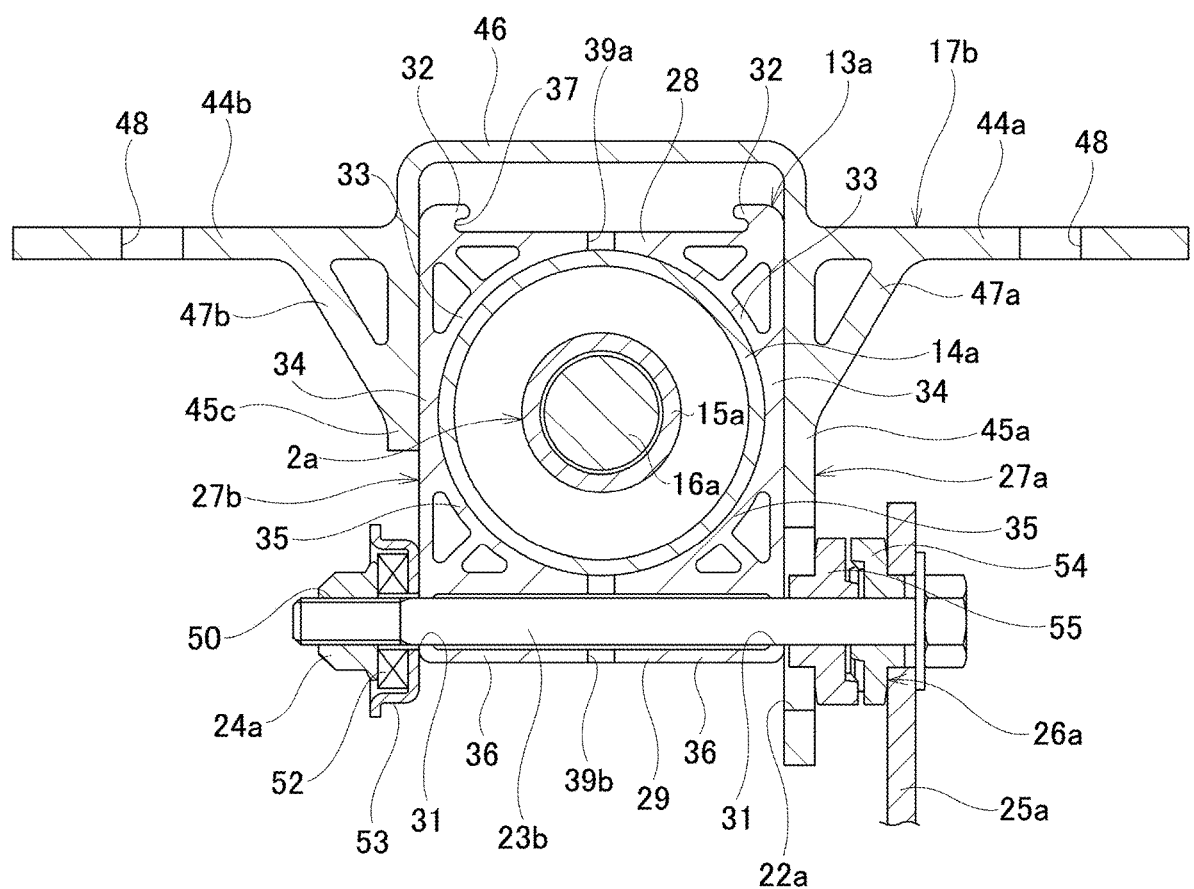
FIG. 6 is a view that corresponds to FIG. 2 illustrating a third example of the embodiment.

FIG. 6 illustrates a third example of an embodiment of the present invention. In the present example, the construction of the support bracket 17b and its peripheral construction are different from that of the first example of the embodiment.

The support bracket 17b of the present example makes the dimension in the up-down direction of the supporting plate sections 45c of the pair of supporting plate sections 45a, 45c that are located on the left side in FIG. 6 smaller than the dimension in the up-down direction of the supporting plate sections 45a that are located on the right side in FIG. 6. Specifically, the position of the lower end section of the supporting plate sections 45c is almost the same as the position of the lower end section of the reinforcement plate 47a. Due to this, the supporting plate sections 45c does not comprise a long hole for tilt adjustment 22a that the supporting plate sections 45a comprises.

In the present example, as an adjustment rod 23b, an adjustment rod which is shorter than the one used in the first example of the embodiment is used. Further, the inside surface in the width direction of the pressing plate 53 which is provided around the adjustment rod 23b is made to directly come in contact with the outside surface in the width direction of the side plate sections 27b of the outer column 13a.

In the present example, the supporting plate section 45c is not pressed inward in the width direction by the pressing plate 53, however, as the pair of widening sections 33 of the outer column 13a are strongly pressed against the inside surfaces in the width direction of the pair of supporting plate sections 45a, 45c, it is possible to hold the outer column 13a with a sufficiently large force by the support bracket 17b. Further, as it becomes possible to move a key-lock unit (not shown) that is provided around the rear end side of the inner column 14a to the front side of the vehicle than the support bracket 17b during a secondary collision or the like, it is possible to secure large contraction stroke of the steering column 3a so as to enhance driver protection. Other construction and function are the same as in the first example of the embodiment.

Fourth Example of the Embodiment

Figure 7:
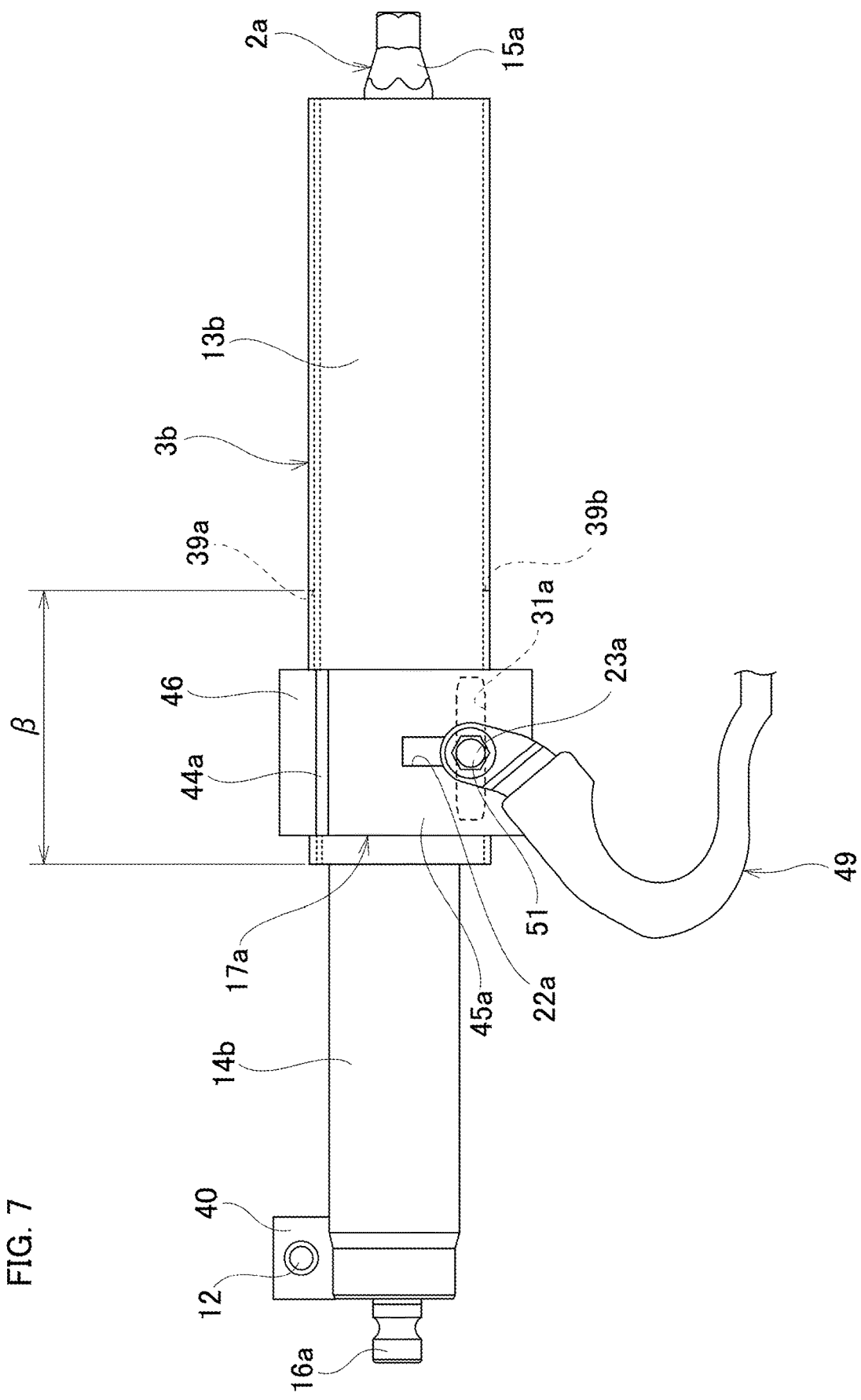
FIG. 7 is a view that corresponds to FIG. 1 illustrating a fourth example of the embodiment.
Figure 8:
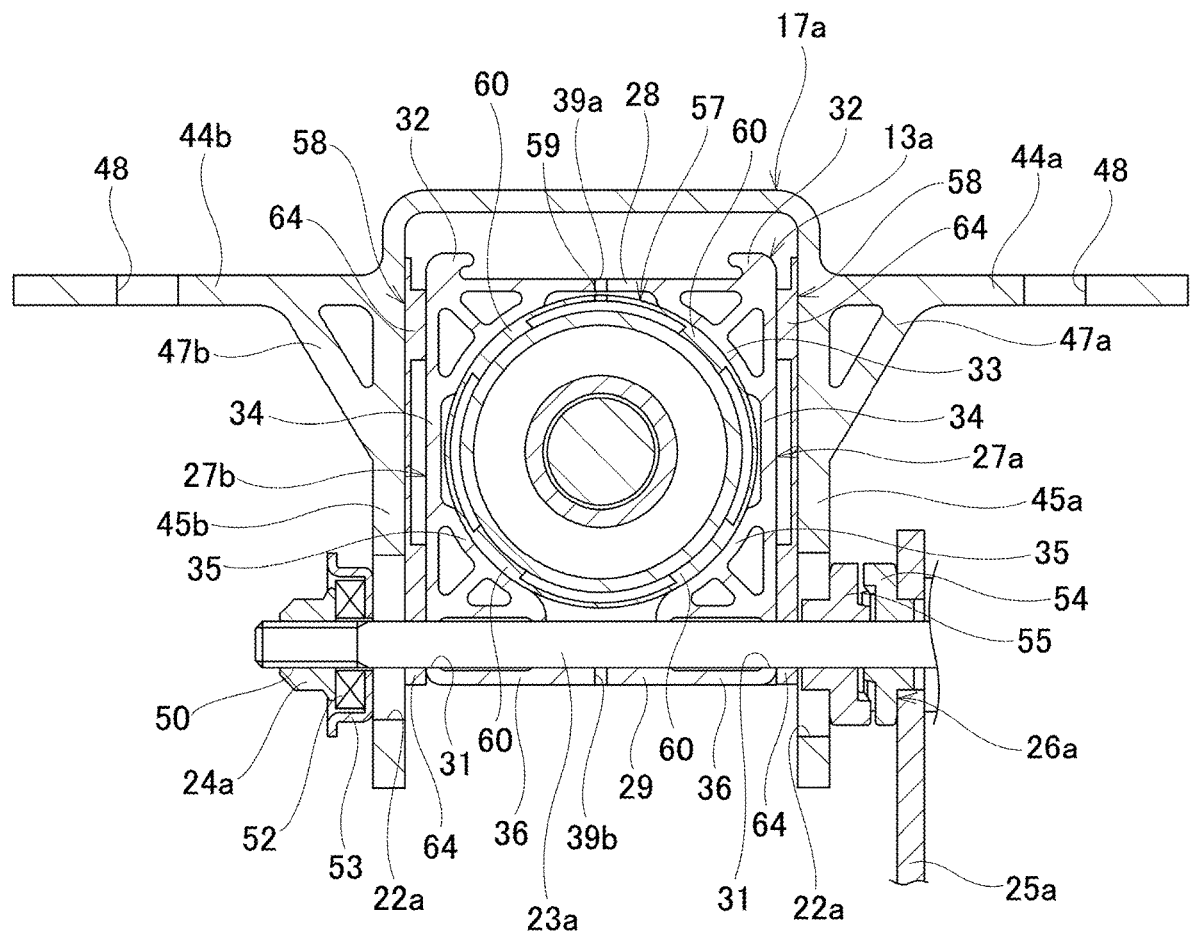
FIG. 8 is a view that corresponds to FIG. 2 illustrating a fifth example of the embodiment.
Figure 9:
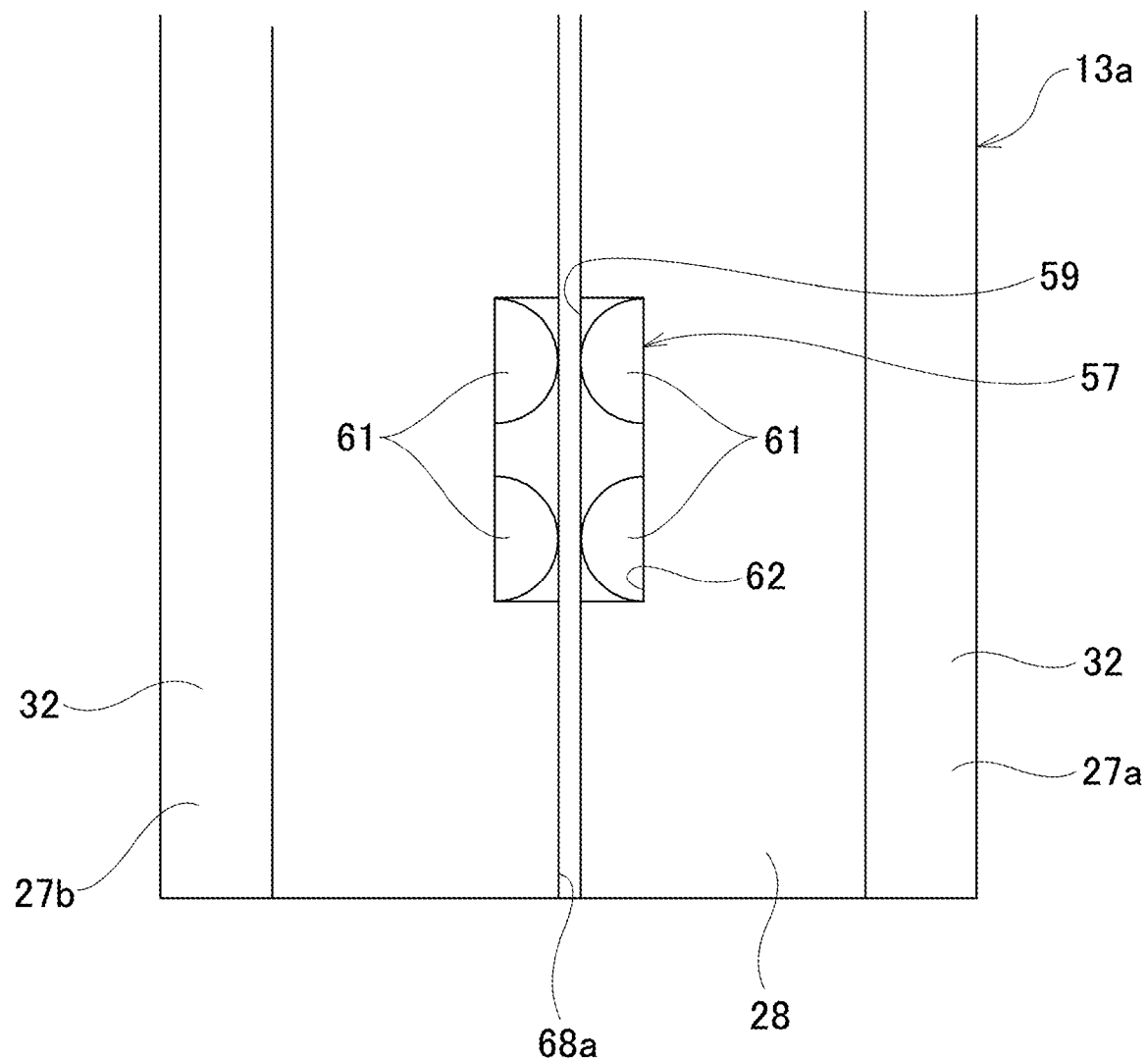
FIG. 9 is a schematic view of the rear-end section of the outer column as seen from the above, illustrated to explain the positioning structure of an annular spacer with respect to the outer column in relation to the fifth example of the embodiment.
Figure 10:
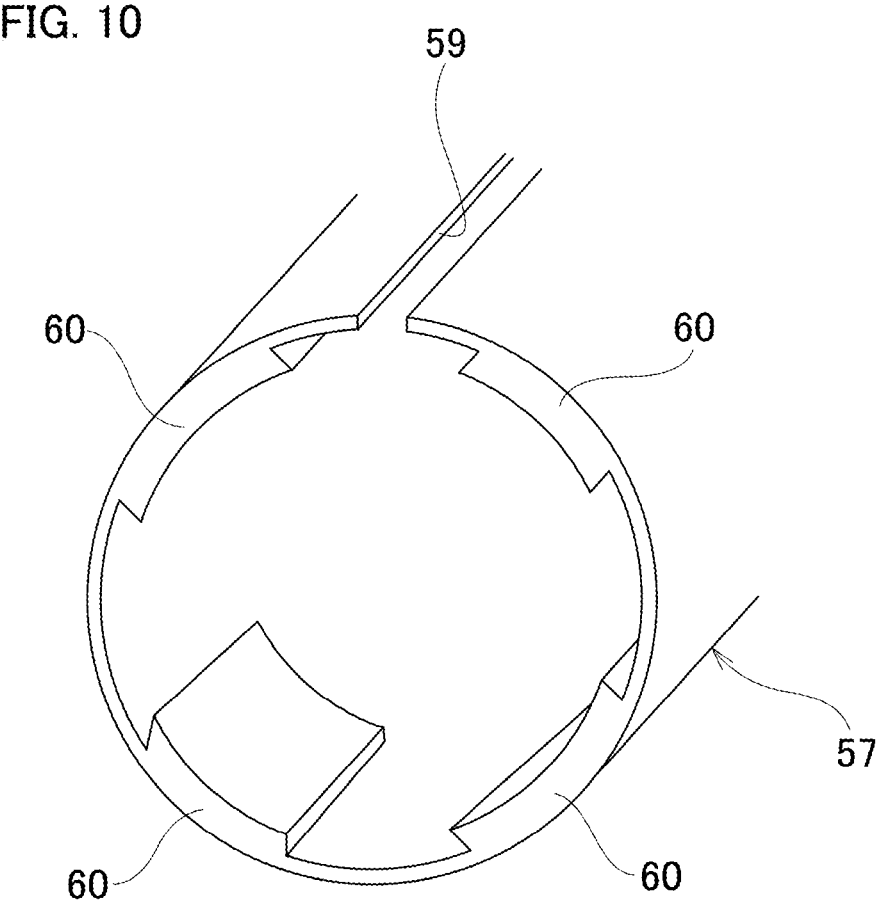
FIG. 10 is a perspective view of the end section in the axial direction illustrating the annular spacer of the fifth example of the embodiment.
Figure 11:
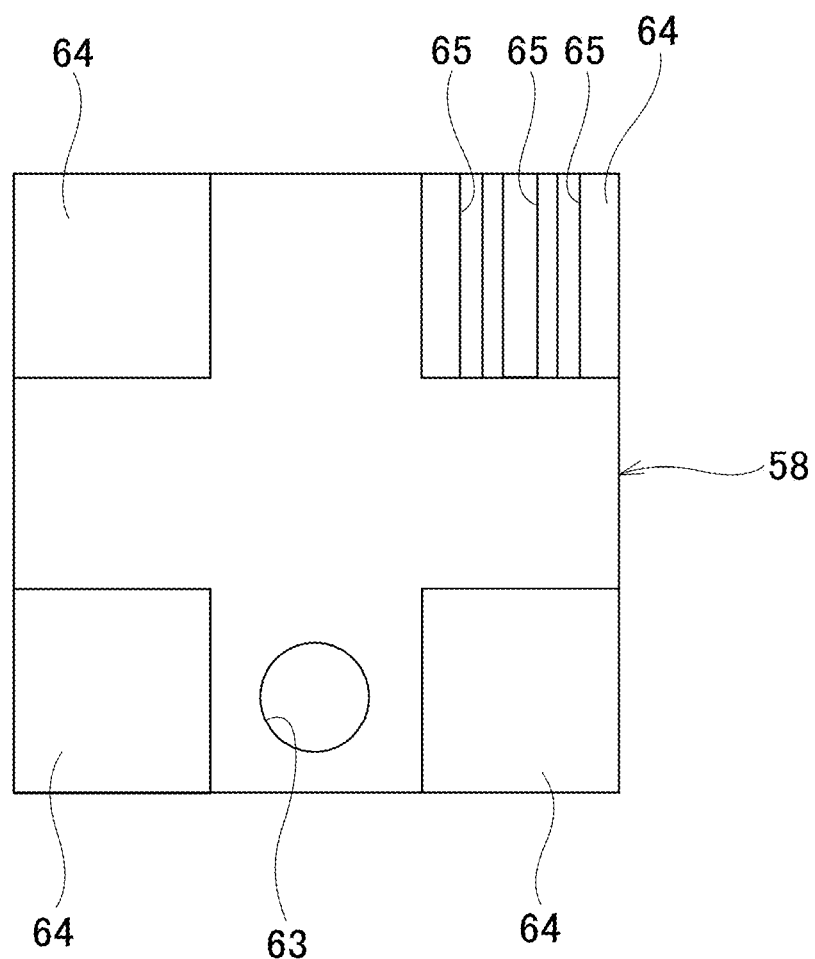
FIG. 11 is a front view of the plate-shaped spacer of the fifth example of the embodiment.

FIG. 7 illustrates the fourth example of the embodiment. In the steering apparatus of the present example, the steering column 3b is formed by locating the outer column 13b on the rear side (upper side) and the inner column 14b on the front side (lower side) with respect to the forward-backward direction. In the present example, the outer column 13b is located in the opposite direction with respect to the forward-backward direction to that in the first example, and the outer column 13b comprises a column-side through hole 31a in its section near the front end. The column-side through hole 31a is not a simple circular hole, but is formed by a long hole for telescopic adjustment that extends in the forward-backward direction. Further, when the outer column 13b is moved in the forward-backward direction in order to adjust the position of the steering wheel 1 in the forward-backward direction, the outer column 13b comprises an upper slit 39a and a lower slit 39b in a range shown with an arrow β in FIG. 7 that includes a section that aligns with the supporting plate sections 45a, 45b of the support bracket 17a with respect to the forward-backward direction.

Similar to the first example of the embodiment, the steering apparatus of the present example can also improve the force to maintain the outer column 13b by the support bracket 17a. Here, like the present example, when locating the outer column 13b on the rear side, it is possible to support the support bracket 17a so as to be able to break away forward by using a releasing member such as a capsule with respect to the vehicle 11. Other construction and function are the same as in the first example of the embodiment.

Fifth Example

FIG. 8 to FIG. 11 illustrate the fifth example of the embodiment. In the present example, an annular spacer 57 is located in a section between the inside surfaces in the width direction of the pair of side plate sections 27a, 27b of the outer column 13a and the outer peripheral surface of the inner column 14a. Further, plate-shaped spacers 58 are placed one by one in spaces between the outside surfaces in the width direction of the pair of side plate sections 27a, 27b of the outer column 13a and a pair of inside surface in the width direction of the supporting plate sections 45a, 45b of the support bracket 17a. The annular spacer 57 and the plate-shaped spacers 58 are made of material that is softer than any of the outer column 13a, inner column 14a, or support bracket 17. Specifically, the annular spacer 57 and the plate-shaped spacer 58 are made of synthetic resin such as polyacetal (POM) and polyphenylene sulfide (PPS). Here, it is also possible to increase strength by adding additives such as glass fiber in the synthetic resin.

The annular spacer 57 has a non-continuous section 59 in one location in the circumferential direction, and has a partial cylinder shape as a whole. The annular spacer 57 comprises thick sections 60 in both end sections in the axial direction at four locations in the circumferential direction. Of the annular spacer 57, each of the thick sections 60 protrudes inward in the radial direction than a section that is off from the thick sections 60 with respect to the circumferential direction, and has a larger thickness. Further, the thick sections 60 on one side section in the axial direction of the annular spacer 57 and the thick sections 60 on the other side in the axial direction of the annular spacer 57 are spaced apart from each other in the axial direction, and the phase with respect to the circumferential direction matches with each other. When the annular spacer 57 is placed in a section between the outer column 13a and the outer peripheral surface of the inner column 14a, each outer surface of the thick sections 60 contacts the inside surface in the width direction of the first swash plate section 33c of the widening section 33 and the inside surface in the width direction of the second swash plate section 35c of the column pressing section 35.

Of its outer peripheral surface, the annular spacer 57 comprises a plurality of protruded sections 61 that protrude outward in the radial direction in each section that is adjacent to both sides in the circumferential direction of the non-continuous section 59. In the present example, each of the protruded sections 61 has a semi-cylinder shape. When locating the annular spacer 57 in a section between the outer column 13a and the outer peripheral surface of the inner column 14a, each protruded section 61 is engaged with a wide section 62 having a width dimension that is larger than a section that is adjacent to both sides in the forward-backward direction that is formed in a part in the forward-backward direction of the upper slit 39a. Due to this, positioning of the annular spacer 57 with respect to the outer column 13a in relation to the forward-backward direction and the circumferential direction is achieved.

The plate-shaped spacer 58 has a rectangular plate shape as a whole, and comprises a through hole 63 in its part for inserting the adjustment rod 23a. The dimension of the plate-shaped spacer 58 in the forward-backward direction is approximately the same as the dimension of the respective supporting plate sections 45a, 45b in the forward-backward direction and the dimension of the plate-shaped spacer 58 in the up-down direction is approximately the same as the dimension of the side plate sections 27a, 27b in the up-down direction. Further, the plate-shaped spacer 58 comprises a rectangular thick section 64 on each of its four corners. Of the plate-shaped spacer 58, the thick section 64 protrudes inward in the width direction than sections other than the thick section 64, and has a larger thickness. Further, when the plate-shaped spacer 58 is located in a section between the outside surface in the width direction of the side plate sections 27a, 27b and the inside surface in the width direction of the supporting plate sections 45a, 45b respectively, each of the inside surfaces in the width direction of the thick sections 64 contacts the outside surface in the width direction of the first vertical plate section 33a of the widening section 33 and the outside surface in the width direction of the second vertical plate section 35a of the column pressing section 35 respectively. Further, of the four thick sections 64, one thick section 64 comprises a plurality of concave grooves 65 that extend in the up-down direction for holding the grease. Here, the plurality of thick sections 64 may also comprise concave grooves 65.

In the present example, when clamping the steering wheel 1 in the adjusted position, the thick sections 60 of the annular spacer 57 is held between the inside surface in the width direction of the column pressing section 35 and the inside surface in the width direction of the widening section 33, and the outer peripheral surface of the inner column 14a. In the construction of the present example, when clamping, while the column pressing sections 35 of the side plate sections 27a, 27b are displaced inward in the width direction, the widening section 33 is displaced outward in the width direction, so that the inside surface in the width direction of the column pressing section 35 and the inside surface in the width direction of the widening section 33, and the outer peripheral surface of the inner column 14a tend to be non-parallel to each other. If contacted as it is, it tends to cause partial contact, which is uneven contact. On the other hand, in the present example, the thick section 60 of the annular spacer 57 is held between the inside surface in the width direction of the column pressing section 35 and the inside surface in the width direction of the widening section 33 and the outer peripheral surface of the inner column 14a, it is possible to effectively prevent partial contact. Further, when the outer column 13a and the inner column 14a are relatively displaced in the forward-backward direction in order to adjust the forward/backward position of the steering wheel 1, although the outer peripheral surface of the inner column 14a and the inner surface of the thick sections 60 come in sliding contact, it is possible to suppress the frictional force that is caused based on the relative displacement at low level because the annular spacer 57 is made of synthetic resin. Therefore, it is possible to prevent increasement of force that is required to adjust the forward/backward position of the steering wheel 1.

Further, when clamping, the thick section 64 of the plate-shaped spacer 58 is held between the outside surface in the width direction of the column pressing section 35 and the outside surface in the width direction of the widening section 33 and each inside surface in the width direction of the supporting plate sections 45a, 45b. In the construction of the present example, when clamping, while the column pressing sections 35 of the side plate sections 27a, 27b are displaced inward in the width direction, the widening section 33 is displaced outward in the width direction, so the outside surface in the width direction of the column pressing section 35 and the outside surface in the width direction of the widening section 33, and each inside surface in the width direction of the supporting plate sections 45a, 45b are tend to be non-parallel to each other. If contacted as it is, it tends to cause partial contact, which is uneven contact. On the other hand, in the present example, the thick section 64 of the plate-shaped spacer 58 is held between the outside surface in the width direction of the column pressing section 35 and the outside surface in the width direction of the widening section 33 and each inside surface in the width direction of the supporting plate sections 45a, 45b, it is possible to effectively prevent partial contact. Further, in the present example, the thick sections 64 comprise a plurality of concave grooves 65 and it is possible to retain grease within the concave grooves 65. Therefore, when the outer column 13a is relatively displaced in the up-down direction with respect to the support bracket 17a in order to adjust the up/down position of the steering wheel 1, it is possible to suppress the frictional force that is caused at the contacting section between the inner surface of the thick section 64 and the outside surface in the width direction of the column pressing section 35 or the outside surface in the width direction of the widening section 33 at low level. Therefore, it is possible to prevent increasement of force that is required to adjust the forward/backward position of the steering wheel 1.

In the present example, although both annular spacer 57 and plate-shaped spacer 58 are provided, it is also possible to provide the annular spacer 57 only or the plate-shaped spacer 58 only. Further, it is also possible to provide a concave groove, which extends in the forward-backward direction, for retaining grease in a thick section 60 of the annular spacer 57. Other construction and function are the same as in the first example of the embodiment.

The construction of each example of the embodiment can be carried out by suitably combining in a range where there is no contradiction. Further, in each example of the embodiment, although each of the pair of side plate sections are illustrated as construction comprising the column pressing section and the widening section, it is possible to employ a construction where only one side plate section of the pair of side plate sections comprise the column pressing section and the widening section. Further, in a construction where each of the pair of side plate sections comprise a column pressing section, it is possible to make the inclination angle of each side surface of the pressing side be different from each other, or to be the same as each other. Similarly, in a construction where each of the pair of side plate sections comprises a widening section, it is possible to make the inclination angle of each inside surfaces on the widening side be different from each other, or to be the same as each other.

In each example of the embodiments, although the inclination angle of the inside surface on the pressing side of the column pressing section and the inclination angle of the inside surface on the widening side of the widening section are the same as each other, it is also possible to make the inclination angle of the inside surface on the pressing side of the column pressing section and the inclination angle of the inside surface on the widening side of the widening section to be different from each other. For example, the inclination angle of the inside surface on the widening side of the widening section can be smaller than the inclination angle of the inside surface on the pressing side of the column pressing section, on the other hand, it is also possible to make the inclination angle of the inside surface on the widening side of the widening section to be larger than the inclination angle of the inside surface on the pressing side of the column pressing section. Further, the shape of the inside surface on the pressing side of the column pressing section and the inside surface on the widening side of the widening section can be straight or curved regardless of the shape of the inner column.

In each example of the embodiments, a construction using a cylindrical inner column is illustrated, however, as an inner column, a polygonal cylindrical inner column such as a hexagon tube, an octagon tube, a decagon tube, a dodecagon tube, and a 14-sided tube can also be used. Here, in this construction, the shape of the inner column is not required to be a regular polygonal shape. Further, in a construction where a polygonal shaped inner column is used, if the inside surface on the widening side of the widening section and the inside surface on the pressing side of the column pressing section are made to be flat surfaces respectively or to be a shape according to plural surfaces of a polygonal surface of the outer peripheral surface of the inner column, it is also possible that the inside surface on the widening side of the widening section and the inside surface on the pressing side of the column pressing section can be contacted with at least one corresponding surface of the polygonal surfaces of the outer peripheral surface of the inner column.

In each example of the embodiments, although the support bracket comprises a pair of reinforcement plate sections, it is possible to omit such reinforcement plate sections, as well as to comprise only one reinforcement plate section. Further, the reinforcement plate section can be constructed so as to be integral with the support bracket, as well as to be separated from the support bracket and fixed to the support bracket by welding or the like. For example, when manufacturing the support bracket by performing extrusion, pultrusion, diecast molding or the like to a material made of light alloy such as aluminum alloy, the reinforcement plate section can be manufactured so as to be integral with the support bracket. On the other hand, when the support bracket is manufactured by performing press processing or the like to a metal plate, it is possible to make the reinforcement plate section to be separated from the support bracket, and make the reinforcement plate section to be fixed to the support bracket. Further, the shape, dimension, and inclination angle or the like of the reinforcement plate section can be suitably changed.

In each example of the embodiments, a construction where the column-side through hole of the clamp mechanism and the outer column of the steering apparatus is located on the lower side in the height direction. However, as an outer column, it is also possible to employ a construction where a column pressing section is provided in an upper section and a widening section is provided in a lower section, which is a construction that is upside down from the construction explained in each example of the embodiments. In this construction, the clamp mechanism of the steering apparatus and the column-side through hole of the outer column are located on the upper side in the height direction, and at least one of the side plate sections of the pair of side plate sections of the outer column comprises at least a bolt housing section, a column pressing section, an intermediate plate section, and a widening section from the upper side which corresponds to one side of the inner column in the height direction. Further, the upper connection section that is located on the same side as the column-side through hole (upper side in the height direction) corresponds to the first connecting section, and the lower connection section that is located on the other side of the, column-side through hole (lower side in the height direction) corresponds to the second connecting section.

In each example of the embodiments, a structure having a steering apparatus which comprises both the telescopic mechanism and the tilt mechanism. However, the steering apparatus may comprise the telescopic mechanism only as well as to comprise the tilt mechanism only.

EXPLANATION OF REFERENCE NUMBERS

1 Steering wheel
2, 2a Steering shaft
3, 3a, 3b Steering column
4 Universal joint
5 Universal joint
6 Intermediate shaft
7 Steering gear unit
8 Tie rod
9 Input shaft
10 Electric motor
11 Vehicle
12 Pivot shaft
13, 13a, 13b Outer column
14, 14a, 14b Inner column
15, 15a Outer shaft
16, 16a Inner shaft
17, 17a, 17b Support bracket
18 Slit
19a, 19b Supported plate sections
20 Long hole for telescopic adjustment
21a, 21b Supporting plate sections
22, 22a Long hole for tilt adjustment (bracket-side through hole)
23, 23a, 23b Adjustment rod
24, 24a Nut
25, 25 Adjusting lever
26, 26a Cam apparatus
27a, 27b Side plate sections
28 Upper connection section
29 Lower connection section 30 Accommodation space
31 Column-side through hole
32 Hook
33 Widening section
33a First vertical plate section
33b First horizontal plate section
33c First swash plate section
33d First reinforcement rib
34 Intermediate plate section
35 Column pressing section
35a Second vertical plate section
35b Second horizontal plate section
35c Second swash plate section
35d Second reinforcement rib
36 Bolt housing section
36a Outer plate section
36b Inner plate section
36c Bottom plate section
37 Fastening concave groove
38 Inside recess section
39a Upper slit
39b Lower slit
40 Lower bracket
41 Insertion hole
42 Flange section
43 Locking section
44a, 44b Installation plate section
45a, 45b, 45c Supporting plate sections
46 Bridge section
47a, 47b Reinforcement plate
48 Installation hole
49 Clamp mechanism
50 Male screw section
51 Head section
52 Thrust bearing
53 Pressing plate
54 Driving-side cam
55 Driven-side cam
56 Outside recess
57 Annular spacer
58 Plate-shaped spacer
59 Non-continuous section
60 Thick section
61 Protruded section
62 Wide section
63 Through hole
64 Thick section

The invention claimed is:

1. A steering apparatus comprising:
a support bracket comprising a pair of supporting plate sections that is placed opposite with each other in a width direction and respectively comprises a bracket side through hole that passes through in the width direction,
an outer column that is placed between the pair of supporting plate sections with respect to the width direction and comprises a column-side through hole that passes through in the width direction,
an inner column that is placed inside the outer column, and
an adjustment rod that constitutes a clamp mechanism for switching between a state where position adjustment of a steering wheel is possible and a state where the position of the steering wheel after adjustment is able to be maintained, and is inserted into the bracket side through hole and the column-side through hole in the width direction of the vehicle,
wherein
the outer column is made of an extrusion molded product, and comprises:
a pair of side plate sections that extends in an axial direction, is placed on both sides of the inner column in the width direction, and comprises the column-side through holes, each of the column-side through holes passing through in the width direction on one side of the inner column with respect to a height direction in a part in the axial direction,
a column pressing section that is provided in at least one side plate section of the pair of side plate sections and is able to press the inner column in a direction away from the column-side through holes with respect to the height direction when displaced inward in the width direction, and
a widening section that is provided in the at least one side plate section and is pressed outward in the width direction via the inner column that is pressed by the column pressing section,
a first connecting section that connects one side sections in the height direction of the pair of side plate sections in the width direction, and comprises a slit in a range that includes a section aligned with the column-side through hole at least with respect to the axial direction, and
a second connecting section that connects the other side sections in the height direction of the pair of side plate sections in the width direction, and comprises a slit in a range that includes a section aligned with the column-side through hole at least with respect to the axial direction.

2. The steering apparatus according to claim 1, wherein the column pressing section is placed in a section that is located between a center axis of the inner column and the column-side through hole with respect to the height direction to protrude inward in the width direction, and comprises an inside surface on a pressing side that is inclined in a direction outward in the width direction as going away from the column-side through holes with respect to the height direction and contacts an outer peripheral surface of the inner column directly or via other members.

3. The steering apparatus according to claim 2, wherein the column pressing section has a triangular tube shape as a whole, and comprises a vertical plate section that is located along the height direction, a horizontal plate section that is located along the width direction, and a swash plate section that is connected to an end section with respect to the height direction of the vertical plate section and an inner end section in the width direction of the horizontal plate section and is provided with the inside surface on the pressing side.

4. The steering apparatus according to claim 3, wherein the column pressing section comprises a reinforcement rib between a connecting section between the vertical plate section and the horizontal plate section, and the swash plate section.

5. The steering apparatus according to claim 1, wherein the widening section is placed in a section that is opposite to the column-side through hole across the center axis of the inner column with respect to the height direction of the at least one side plate section to protrude inward in the width direction, and comprises an inside surface of a widening side that is inclined in a direction inward in the width direction as going away from the column-side through hole with respect to the height direction.

6. The steering apparatus according to claim 5, wherein the widening section has a triangular tube shape as a whole, and comprises a vertical plate section that is located along the height direction, a horizontal plate section that is located along the width direction, and a swash plate section that is connected to an end section in the height direction of the vertical plate section and an inner end section in the width direction of the horizontal plate section and is provided with the inside surface on the widening side.

7. The steering apparatus according to claim 6, wherein the widening section comprises a reinforcement rib between a connecting section between the vertical plate section and the horizontal plate section, and the swash plate section.

8. The steering apparatus according to claim 1, comprising an inside recess section that is recessed outward in the width direction in a range that includes a section aligned with the center axis of the inner column with respect to the height direction of the inside surface in the width direction of the pair of side plate sections.

9. The steering apparatus according to claim 1, comprising an outside recess section that is recessed inward in the width direction in a range that includes a section aligned with the center axis of the inner column with respect to the height direction of the outside surface in the width direction of the pair of side plate sections.

10. The steering apparatus according to claim 1, wherein the outer column is placed on the front side and the inner column is placed on a rear side with respect to the forward-backward direction of the vehicle, and a lower bracket, which is separate from the outer column, is installed in a front-end section of the outer column for inserting a pivot shaft that is placed in the width direction of the vehicle.

11. The steering apparatus according to claim 1, wherein the outer column is placed on a rear side and the inner column is placed on a front side with respect to the forward-backward direction of the vehicle.

12. The steering apparatus according to claim 1, wherein a spacer that is softer than any of the outer column, the inner column, and the support bracket is placed in at least one section of a section between the outer column and the inner column, and a section between the pair of side plate sections of the outer column and the pair of supporting plate sections of the support bracket.

13. The steering apparatus according to claim 12, wherein the spacer is constructed by an annular spacer which is placed in a section between the outer column and the inner column, and the annular spacer comprises a thick section having a thickness that is larger than the other section of the annular spacer in a section that contacts with at least one of an inside surface on a pressing side or an inside surface on a widening side.

14. The steering apparatus according to claim 13, wherein the thick section comprises a concave groove for retaining lubricating oil.

15. The steering apparatus according to claim 12, wherein the spacer is constructed by a plate-shaped spacer that is placed in a section between the pair of plate sections of the outer column and the pair of supporting plate sections of the support bracket, and comprises a thick section having a thickness that is larger than the other section of the plate-shaped spacer in a section that contacts with at least one of the outside surfaces in the width direction of at least one of the column pressing section or the widening section.

16. The steering apparatus according to claim 15, wherein the thick section comprises a concave groove for retaining lubricating oil.

17. A steering apparatus comprising:
a support bracket comprising a pair of supporting plate sections that is placed opposite with each other in a width direction and respectively comprises a bracket side through hole that passes through in the width direction,
an outer column that is placed between the pair of supporting plate sections with respect to the width direction and comprises a column-side through hole that passes through in the width direction,
an inner column that is placed inside the outer column, and
an adjustment rod that constitutes a clamp mechanism for switching between a state where position adjustment of a steering wheel is possible and a state where the position of the steering wheel after adjustment is able to be maintained, and is inserted into the bracket side through hole and the column-side through hole in the width direction of the vehicle,
wherein
the outer column comprises:
a pair of side plate sections respectively extending in an axial direction of the steering apparatus and comprising the column-side through holes, each of the column-side through holes passing through the width direction on one side of the inner column with respect to a height direction in a part in the axial direction, the pair of side plate sections placed on both sides in the width direction of the inner column,
a column pressing section that is provided in at least one side plate section of the pair of side plate sections, has a triangular tube shape as a whole, and is placed in a section on the one side with respect to the height direction and between the middle section in the height direction and the column-side through hole of at least one side plate section of the pair of side plate sections to protrude inward in the width direction,
the column pressing section comprising a vertical plate section that is located along the height direction, a horizontal plate section that is located along the width direction, and a swash plate section that is connected to an end section with respect to the height direction of the vertical plate section and an inner end section in the width direction of the horizontal plate section and is provided with an inside surface on a pressing side,
a widening section that is provided in the at least one side plate section, has a triangular tube shape as a whole, and is placed in a section on the other side with respect to the height direction to protrude inward in the width direction,
the widening section comprising a vertical plate section that is located along the height direction, a horizontal plate section that is located along the width direction, and a swash plate section that is connected to an end section with respect to the height direction of the vertical plate section and an inner end section in the width direction of the horizontal plate section and is provided with an inside surface on the widening side,
an intermediate plate section that is provided in the at least one side plate section, and connects the column pressing section and the widening section in the height direction,
a first connecting section that connects one side sections in the height direction of the pair of side plate sections in the width direction, and comprises a slit in a range that includes a section aligned with the column-side through hole at least with respect to the axial direction, and
a second connecting section that connects the other side sections in the height direction of the pair of side plate sections in the width direction, and comprises a slit in a range that includes a section aligned with the column-side through hole at least with respect to the axial direction.

18. The steering apparatus according to claim 17, wherein the column pressing section comprises a reinforcement rib between a connecting section between the vertical plate section and the horizontal plate section, and the swash plate section.

19. The steering apparatus according to claim 17, wherein the widening section comprises a reinforcement rib between a connecting section between the vertical plate section and the horizontal plate section, and the swash plate section.

20. The steering apparatus according to claim 17, comprising an inside recess section that is recessed outward in the width direction in the middle section in the height direction of an inside surface in the width direction of the pair of side plate sections.

21. The outer column according to claim 17, further comprising an outside recess section that is recessed inward in the width direction in the middle section in the height direction of an outside surface in the width direction of the pair of plate sections.

* * * * *